(12) United States Patent
Fermann et al.

(10) Patent No.: US 8,072,678 B2
(45) Date of Patent: Dec. 6, 2011

(54) MODULAR, HIGH ENERGY, WIDELY-TUNABLE ULTRAFAST FIBER SOURCE

(75) Inventors: Martin E. Fermann, Ann Arbor, MI (US); Almantas Galvanauskas, Ann Arbor, MI (US); Donald J. Harter, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 19 days.

(21) Appl. No.: 12/608,636

(22) Filed: Oct. 29, 2009

(65) Prior Publication Data

US 2010/0046067 A1   Feb. 25, 2010

Related U.S. Application Data

(60) Continuation of application No. 11/643,765, filed on Dec. 22, 2006, now Pat. No. 7,688,499, which is a continuation of application No. 11/074,765, filed on Mar. 9, 2005, now Pat. No. 7,167,300, which is a division of application No. 09/576,772, filed on May 23, 2000, now Pat. No. 6,885,683.

(51) Int. Cl.
*H01S 3/11* (2006.01)

(52) U.S. Cl. .................................. 359/341.5; 359/346

(58) Field of Classification Search .......... 359/346–348, 359/341.41, 341.42, 337.4
See application file for complete search history.

(56) References Cited

U.S. PATENT DOCUMENTS

| 4,588,957 A | 5/1986 | Balant et al. |
| 4,660,205 A | 4/1987 | Harter et al. |
| 4,750,809 A | 6/1988 | Kafka et al. |
| 4,829,529 A | 5/1989 | Kafka |
| 5,185,827 A | 2/1993 | Poole |
| 5,235,606 A | 8/1993 | Mouron et al. |

(Continued)

FOREIGN PATENT DOCUMENTS

DE   10124983 A1   3/2002

(Continued)

OTHER PUBLICATIONS

M.E. Fermann, V.I.Kruglov, B.C. Thomsen, J.M. Dudley and J.D. Harvey, Self-Similar Propogation and Amplification of Parabolic Pulses in Optical Fibers, (received Feb. 22, 2000), Physical Review Letters, Jun. 26, 2000, pp. 6010-6013, vol. 84, No. 26 @2000 the American Physical Society.

(Continued)

*Primary Examiner* — Mark Hellner
*Assistant Examiner* — Ari M Diacou
(74) *Attorney, Agent, or Firm* — Sughrue Mion, PLLC

(57) ABSTRACT

A modular, compact and widely tunable laser system for the efficient generation of high peak and high average power ultrashort pulses. System compactness is ensured by employing efficient fiber amplifiers, directly or indirectly pumped by diode lasers. Dispersive broadening is introduced by dispersive pulse stretching in the presence of self-phase modulation and gain, resulting in the formation of high-power parabolic pulses. In addition, dispersive broadening is also introduced by simple fiber delay lines or chirped fiber gratings. The phase of the pulses in the dispersive delay line is controlled to quartic order by the use of fibers with varying amounts of waveguide dispersion or by controlling the chirp of the fiber gratings. After amplification, the dispersively stretched pulses can be re-compressed to nearly their bandwidth limit by the implementation of another set of dispersive delay lines. A particularly compact implementation of the whole system uses fiber oscillators in conjunction with fiber amplifiers.

21 Claims, 17 Drawing Sheets

U.S. PATENT DOCUMENTS

| | | | |
|---|---|---|---|
| 5,251,062 A | 10/1993 | Snitzer et al. | |
| 5,335,236 A | 8/1994 | Toeppen | |
| 5,363,386 A | 11/1994 | Smith | |
| 5,400,350 A | 3/1995 | Galvanauskas | |
| 5,414,725 A | 5/1995 | Fermann et al. | |
| 5,440,573 A | 8/1995 | Fermann | |
| 5,450,427 A | 9/1995 | Fermann et al. | |
| 5,479,422 A | 12/1995 | Fermann et al. | |
| 5,485,480 A | 1/1996 | Kleinerman | |
| 5,489,984 A | 2/1996 | Hariharan et al. | |
| 5,499,134 A | 3/1996 | Galvanauskas et al. | |
| 5,499,234 A | 3/1996 | Rider et al. | |
| 5,513,194 A | 4/1996 | Tamura | |
| 5,530,582 A | 6/1996 | Clark | |
| 5,585,913 A | 12/1996 | Hariharan et al. | |
| 5,617,434 A | 4/1997 | Tamura et al. | |
| 5,627,848 A | 5/1997 | Fermann et al. | |
| 5,633,885 A | 5/1997 | Galvanauskas et al. | |
| 5,677,921 A * | 10/1997 | Schaffers et al. | 372/41 |
| 5,689,519 A | 11/1997 | Fermann et al. | |
| 5,694,408 A | 12/1997 | Bott et al. | |
| 5,696,782 A | 12/1997 | Harter et al. | |
| 5,701,319 A | 12/1997 | Fermann | |
| 5,778,016 A | 7/1998 | Sucha et al. | |
| 5,818,630 A | 10/1998 | Fermann et al. | |
| 5,847,863 A | 12/1998 | Galvanauskas et al. | |
| 5,862,287 A | 1/1999 | Stock et al. | |
| 5,867,304 A | 2/1999 | Galvanauskas et al. | |
| 5,867,305 A | 2/1999 | Waarts et al. | |
| 5,880,877 A | 3/1999 | Fermann et al. | |
| 5,933,271 A | 8/1999 | Waarts et al. | |
| 5,995,281 A | 11/1999 | Simon | |
| 6,034,975 A | 3/2000 | Harter et al. | |
| 6,072,811 A | 6/2000 | Fermann | |
| 6,097,741 A | 8/2000 | Lin | |
| 6,150,630 A | 11/2000 | Perry | |
| H1926 H | 12/2000 | Carruthers et al. | |
| 6,178,041 B1 | 1/2001 | Simon | |
| 6,195,369 B1 | 2/2001 | Kumar et al. | |
| 6,236,779 B1 | 5/2001 | Kafka | |
| 6,243,522 B1 | 6/2001 | Allan | |
| 6,252,892 B1 | 6/2001 | Jiang | |
| 6,269,206 B1 | 7/2001 | Simon | |
| 6,282,016 B1 | 8/2001 | MacCormack et al. | |
| 6,356,088 B1 | 3/2002 | Simon | |
| 6,643,429 B2 | 11/2003 | Robinson et al. | |
| 6,856,737 B1 | 2/2005 | Parker et al. | |
| 6,865,328 B2 | 3/2005 | Berkey et al. | |
| 6,885,683 B1 | 4/2005 | Fermann | |
| 6,917,631 B2 | 7/2005 | Richardson | |
| 6,968,107 B2 | 11/2005 | Belardi | |
| 7,088,756 B2 | 8/2006 | Fermann | |
| 7,190,705 B2 | 3/2007 | Fermann | |
| 7,233,607 B2 | 6/2007 | Richardson et al. | |
| 2002/0168161 A1 | 11/2002 | Price et al. | |
| 2002/0172486 A1 | 11/2002 | Fermann | |
| 2003/0156605 A1 | 8/2003 | Richardson | |
| 2004/0017833 A1 | 1/2004 | Cundiff et al. | |
| 2004/0213303 A1 | 10/2004 | Litvin | |
| 2005/0232313 A1 | 10/2005 | Fermann | |
| 2007/0002910 A1 | 1/2007 | Liu et al. | |

FOREIGN PATENT DOCUMENTS

| | | |
|---|---|---|
| DE | 112004002187 T5 | 12/2007 |
| JP | 2002-118315 A | 4/2002 |
| WO | 03-038486 A2 | 5/2003 |

OTHER PUBLICATIONS

M.E. Fermann et al, All-fiber source of 100-nj subpicosecond pulses, Appl. Phys. Lett., vol. 64, 1994, pp. 1315-1317).

K.Tamura et al, Pulse Compression by Nonlinear Pulse Evolution with Reduced Optical Wave Breaking in Erbium-Doped Fiber Amplifiers, Opt. Lett., vol. 21, No. 1, p. 68 (1996).

BJ Ainslie et al, A Review of Single-Mode Fibers with Modified dispersion Characteristics, J. Lightwave Techn., vol. LT-4, No. 8, (1986) pp. 967-979.

D.T. Watson et al, Broad-bandwidth pulse amplification to the 10-J level in an ytterbium-doped germanosilicate fiber, Opt. Lett., vol. 21, No. 14, (1996), 1061-1063.

J. Porta et al, Environmentally stable picosecond ytterbium fiber laser with a broad tuning range, Opt. Lett., vol. 23, No. 8, (1998) pp. 615-617.

Nishizawa et al, Simultaneous Generation of Wavelength Tunable Two-Colored Femtosecond Soliton Pulses Using Optical Fibers, IEEE Photonics Tech., Lett., vol. 11, No. 4, (1999) pp. 421-423.

J.P. Gordon, Theory of the Soliton Self-Frequency Shift, Op. Lett., vol. 11, No. 10, (1986) pp. 662-664.

T.M. Monro et al, Holey Optical Fibers: An Efficient Modal Model, J.Lightwave, Techn. Vo.l 17, No. 6, (1999) pp. 1093-1102.

B.Nikolaus et al, 12xPulse Compression Using Optical Fibers, Appl. Phys. Lett., 42, (1983) pp. 1-2.

D. Anderson et al, Wave-breaking-freepulses in nonlinear-optical fibers, J. Opt. Soc. Am. B10, 1185 (1993).

Bada et al., Regenerative Amplification in Alexandrite of pulse from Specialized Oscillators, IEEE J of Quantum Electronics vol. 24, No. 6, p. 1167 Jun. 1988.

Botez et al., The Next Generation of High-Power Semiconductor Diode Lasers, TRW Space and Defense Quest, pp. 21-31, Winter 1991/1992.

Duling III et al., Compact fiber soliton lasers produce ultrashort pulses, Laser Focus World Apr. 1993 p. 213.

Fermann et al., Environmentally stable Keer-type Mode-locked erbium Fiber Laser Producing306-fs pulses, ME Fermann, Optics Letters Jan. 1, 1994, pp. 43-38 Optics Letters vol. 19, No. 1 OSA.

Fermann et al., All-fiber source of 100 nJ subpicosecond pulses by M.E. Fermann, A. Galvanauskas and D. Harter, and published in Appl. Phys. Letters vol. 64, 11, 1994, pp. 1315-1317.

Harter et al., Short pulse amplification in tunable solid state materials, Harter, et al., SPIE, vol. 1229, 1990, pp. 19-28.

Mizoguchi et al., 100-fs, 10-Hz, terawatt KrF laser, M. Mizoguchi, K. Kondo, and S. Watanabe, Josa B, vol. 9, Iss. 4, pp. 560-564 (1992).

Nabekawa et al., Terawatt KrF/Ti:sapphire hybrid laser system, Optics Letters vol. 18, No. 22, pp. 1922-1924, Nov. 15, 1993.

Tamura et al., Technique for obtaining high-energy ultrashort pulses from an additive-pulse mode-locked erbium-doped fiber ring laser, K.Tamura, C.Doerr, L.Nelson, H.Haus, E.Ippen, Optics Letters vol. 19 Is.1 p. 46 (1994).

Yakymyshyn et al., Frequency-doubled, additive-pulse, mode-locked NaCI:OH laser, Optics Letters vol. 14, No. 15, p. 793 Aug. 1, 1989.

Cautaerts et al., Stretched pulse Yb3+:silica fiber laser, V. Cautaerts, D.J. Richardson, R. Paschotta, D.C. Hanna Optics Letters vol. 22, No. 5, Mar. 1, 1997 p. 316-318.

Hofer et al., High-power neodymium soliton fiber laser that uses a chirped fiber grating Optics Letters, M. Hofer, M. H. Ober, R. Hofer, M. E. Fermann Opt. Lett, vol. 20,#16, p. 1701-1703, 1995.

Jiang et al., Nonlinearly limited saturable-absorber mode locking of an erbium fiber laser, M. Jiang et al, Optics Letters vol. 24, No. 15 Aug. 1, 1999 p. 1074-1076.

Khrushchev et al., Amplification of femtosecond pulses in Er+3-doped single-mode optical fibres. Khrushchev Electronics Letters, vol. 26. No. 7, Mar. 29, 1990 pp. 456-458.

Valentin Gapontsev, et al "100kW Ytterbium Fiber Laser", SPIE vol. 3613, Jan. 1999, pp. 49-54.

* cited by examiner

MODULAR, HIGH ENERGY, WIDELY-TUNABLE ULTRAFAST FIBER SOURCE

This is a Continuation application of application Ser. No. 11/643,765, filed Dec. 22, 2006, which is a Continuation of application Ser. No. 11/074,765, filed Mar. 9, 2005, which is a Divisional Application of application Ser. No. 09/576,772, filed May 23, 2000. The disclosures of which are incorporated herein by reference in their entirety.

BACKGROUND OF THE INVENTION

1. Field of the Invention

This invention relates to wavelength-tunable, compact, modular and efficient sources of high-power ultrashort laser pulses, which are an essential ingredient in the commercial use of ultrafast laser technology.

2. Description of the Related Art

Fiber lasers have long been known to provide an effective medium for the generation of ultrashort pulses, though so far such systems have mainly been based on chirped pulse amplification using chirped Bragg gratings, with limited options for wavelength tunability and limitations in the minimal achievable pulse width (A. Galvanauskas and M. E. Fermann, 'Optical Pulse Amplification Using Chirped Bragg Gratings,' U.S. Pat. No. 5,499,134). Chirped Bragg gratings have indeed been developed into widely available devices, and the chirp inside the Bragg gratings can be designed to be linear or even nonlinear to compensate any order of dispersion in a chirped pulse amplification system (A. Galvanauskas et al., 'Hybrid Short-Pulse Amplifiers with Phase-Mismatch Compensated Pulse Stretchers and Compressors', U.S. Pat. No. 5,847,863), which is important for the generation of bandwidth limited pulses, i.e., the shortest possible pulses for a given spectral pulse bandwidth.

To maximize the power and energy limitations of optical fibers, the use of chirped pulse amplification is clearly desirable, though at the same time the demands for system integration (Bragg gratings need to be operated in reflection rather than in transmission to provide the highest possible dispersion) may render the use of such standard chirped pulse amplification systems impractical. As an alternative to chirped pulse amplification, the amplification of high-power pulses in multi-mode fiber amplifiers has been suggested (M. E. Fermann and D. Harter, 'Single-mode Amplifiers and Compressors Based on Multi-mode Optical Fibers', U.S. Pat. No. 5,818,630). As yet another alternative to chirped pulse amplification the use of soliton Raman compression in fiber amplifiers, or, generally, the use of pulse compression inside nonlinear fiber amplifiers was proposed (M. E. Fermann, A. Galvanauskas and D. Harter, 'Apparatus and Method for the Generation of High-power Femtosecond Pulses from a Fiber Amplifier', U.S. Pat. No. 5,880,877).

Clearly the use of multi-mode fibers can be combined with chirped pulse amplification and soliton Raman compression to further improve the performance of such systems. However, to date no methods for controlling the pulse-shape for a further optimization of the overall system performance have been described. Equally, the use of self-phase modulation in the stretcher part of such chirped pulse amplification systems has not been suggested.

Moreover, as a compromise between system compactness and high-energy capability, the use of a fiber dispersive delay line in conjunction with a bulk optic compressor can be advantageous, providing at least partial integration of a high-energy fiber laser system [M. E. Fermann A. Galvanauskas and D. Harter: 'All fiber source of 100 nJ sub-picosecond pulses', Appl. Phys. Lett., vol. 64, 1994, pp. 1315-1317]. However, to date no effective methods for controlling higher-order 3rd and 4th order dispersion in such stretcher and compressor combinations for the re-compression of the pulses to near their bandwidth limit have been developed.

As an alternative to chirped pulse amplification, it was also previously suggested that efficient pulse compression can be obtained by using high-gain positive dispersion (non-soliton supporting) silica-based single-mode erbium amplifiers in combination with bulk prism compressors (K. Tamura and M. Nakazawa, "Pulse Compression by Nonlinear Pulse Evolution with Reduced Optical Wave Breaking in Erbium-Doped Fiber Amplifiers," Opt. Lett., Vol. 21, p. 68 (1996)). However, the use of this technique in conjunction with silica-based erbium amplifiers is problematic, because the requirement for positive dispersion limits the fiber core size to around 5 μm, otherwise, negative material dispersion dominates over positive waveguide dispersion, producing an overall negative fiber dispersion. Equally, silica-based multi-mode fibers have negative dispersion at erbium amplifier wavelengths, preventing their use in efficient pulse compression. Thus, the limited core size of positive dispersion erbium amplifiers greatly reduces the achievable pulse energy.

Moreover, it was not shown by Tamura et al. how to generate additional spectral broadening and pulse amplification after the one erbium amplifier. Equally, it was not taught by Tamura et al. how to optimize the performance of the prism pulse compressor to compensate for the dispersion of the erbium amplifier.

As another alternative to chirped pulse amplification, the use of a non-amplifying optical fiber in conjunction with a bulk grating compressor was suggested (D. Grischkowsky et al. and J. Kafka et al., U.S. Pat. No. 4,750,809). However, since there is no gain in such a system, high pulse energies have to be coupled into the nonlinear optical element in order to obtain a high output power, greatly reducing the peak power capability of the system. Moreover, no means for compensating for higher-order dispersion in such an optical arrangement was discussed, greatly limiting the practicability of this approach. In addition, without control of the pulse shape at the input to such a system, spectral broadening with a linear chirp can only be obtained for very limited input powers. Control of the input pulse shape was not discussed by Kafka et al. Equally, to obtain the shortest possible pulses in conjunction with a bulk grating compressor, the control of 2nd and 3rd order dispersion in such a nonlinear optical element is required, which was also not discussed by Kafka et al.

Compensation for chromatic dispersion in a (low-power) lightwave signal using the chromatic dispersion in another (dispersion-compensating) waveguide element was introduced to optimize the performance of telecommunication systems (C. D. Poole, 'Apparatus of compensating chromatic dispersion in optical fibers', U.S. Pat. No. 5,185,827). However, for high-power pulse sources, self-phase modulation introduced by a dispersion-compensating waveguide element prevents their effective use. Moreover, the system discussed by Poole only operates in conjunction with mode-converters and/or rare-earth-doped fiber for either selectively absorbing a higher-order spatial mode in the dispersion-compensating waveguide element or selectively amplifying the fundamental mode in the dispersion-compensating waveguide element. No means were taught for compensating for the dispersion of high-power optical pulses in the presence of self-phase modulation, and no means of implementing a dispersion-compensating waveguide without mode-converters were suggested.

As an alternative to the use of mode-converters and higher-order modes, fibers with W-style refractive index profiles are known (B. J. Ainslie and C. R. Day, 'A review of single-mode fibers with modified dispersion characteristics'; J. Lightwave Techn., vol. LT-4, No. 8, pp. 967-979, 1988). However, the use of such fiber designs in high-power fiber chirped pulse amplification systems has not been discussed.

To maximize the efficiency of ultrafast fiber amplifiers, the use of Yb fiber amplifiers has been suggested (D. T. Walton, J. Nees and G. Mourou, "Broad-bandwidth pulse amplification to the 10 µJ level in an ytterbium-doped germanosilicate fiber," Opt. Lett., vol. 21, no. 14, pp. 1061 (1996)), though the work by Walton et al., employed an Argon-laser pumped Ti:sapphire laser for excitation of the Yb-doped fibers as well as a modelocked Ti:sapphire laser as a source of signal pulses, which is extremely inefficient and clearly incompatible with a compact set-up. Moreover, no means for controlling the phase of the optical pulses in the amplification process were suggested, i.e., 100 fs pulses from the Ti:sapphire laser were directly coupled to the Yb amplifier through a 1.6 km long single-mode fiber dispersive delay line, which produces large phase distortions due to higher-order dispersion, greatly limiting the applicability of the system to ultrafast applications. Rather, to induce high-quality high-power parabolic pulse formation inside the Yb amplifier, seed pulses in the range from 200-400 fs would be preferable for an Yb amplifier length of a few meters. The use of a single-mode Yb-doped fiber amplifier by Walton et al. further greatly limited the energy and power limits of the Yb amplifier. The use of a multi-mode Yb-doped fiber was suggested in U.S. application Ser. No. 09/317,221, the contents of which are hereby incorporated herein by reference, though a compact ultrashort pulse source compatible with Yb amplifiers remained elusive.

A widely tunable pulsed Yb-fiber laser was recently described incorporating an active optical modulation scheme (J. Porta et al., 'Environmentally stable picosecond ytterbium fiber laser with a broad tuning range', Opt. Lett., vol. 23, pp. 615-617 (1998). Though this fiber laser offered a tuning range approximately within the gain bandwidth of Yb, application of the laser to ultrafast optics is limited due to the relatively long pulses generated by the laser. Generally, actively modelocked lasers produce longer pulses than passively modelocked lasers, and in this present case the generated pulse bandwidth was only 0.25 nm with a minimal pulse width of 5 ps.

Widely wavelength-tunable fiber laser sources were recently described using Raman-shifting in conjunction with frequency-conversion in a nonlinear crystal. (See M. E. Fermann et al., U.S. Pat. No. 5,880,877 and N. Nizhizawa and T. Goto, "Simultaneous Generation of Wavelength Tunable Two-Colored Femtosecond Soliton Pulses Using Optical Fibers," Photonics Techn. Lett., vol. 11, no. 4, pp 421-423). Essentially spatially invariant fiber Raman shifters were suggested, resulting in limited wavelength tunability of 300-400 nm (see Nizhizawa et al.). Moreover, no method was known for minimizing the noise of such a highly nonlinear system based on the successive application of Raman shifting and nonlinear frequency conversion in a nonlinear optical crystal. Further, the system described by Nizhizawa et al. relied on a relatively complex low power polarization controlled erbium fiber oscillator amplified in an additional polarization controlled erbium fiber amplifier for seeding the Raman shifter. Moreover, no method was described that allowed Raman-shifting of the frequency-doubled output from an Er fiber laser.

A Raman shifter seeded directly with the pulses from a high-power fiber oscillator or the frequency-converted pulses from a high-power fiber oscillator would clearly be preferable. Such fiber oscillators were recently described using multi-mode optical fibers (M. E. Fermann, 'Technique for mode-locking of multi-mode fibers and the construction of compact high-power fiber laser pulse sources', U.S. Ser. No. 09/199,728). However, to date no methods for frequency-converting such oscillators with the subsequent use of Raman-shifting have been demonstrated.

SUMMARY OF THE INVENTION

Therefore, it is an object of the present invention to introduce a modular, compact, widely-tunable, high peak and high average power, low noise ultrafast fiber amplification laser system.

It is a further object of the invention to ensure modularity of the system by employing a variety of easily interchangeable optical systems, such as 1) short pulse seed sources, 2) wide bandwidth fiber amplifiers, 3) dispersive pulse stretching elements, 4) dispersive pulse compression elements, 5) nonlinear frequency conversion elements and 6) optical components for fiber delivery. In addition, any of the suggested modules can be comprised of a subset of interchangeable optical systems.

It is a further object of the invention to ensure system compactness by employing efficient fiber amplifiers, directly or indirectly pumped by diode lasers as well as highly integrated dispersive delay lines. The high peak power capability of the fiber amplifiers is greatly expanded by using parabolic or other optimized pulse shapes. In conjunction with self-phase modulation, parabolic pulses allow for the generation of large-bandwidth high-peak power pulses, as well as for well-controlled dispersive pulse stretching. High power parabolic pulses are generated in high-gain single or multi-mode fiber amplifiers operating at wavelengths where the fiber material dispersion is positive.

Parabolic pulses can be delivered or transmitted along substantial fiber lengths even in the presence of self-phase modulation or general Kerr-effect type optical nonlinearities, while incurring only a substantially linear pulse chirp. At the end of such fiber delivery or fiber transmission lines, the pulses can be compressed to approximately their bandwidth limit.

Further, the high energy capability of fiber amplifiers is greatly expanded by using chirped pulse amplification in conjunction with parabolic pulses or other optimized pulse shapes, which allow the toleration of large amounts of self-phase modulation without a degradation of pulse quality. Highly integrated chirped pulse amplification systems are constructed without compromising the high-energy capabilities of optical fibers by using fiber-based pulse stretchers in conjunction with bulk-optic pulse compressors (or low non-linearity Bragg gratings) or periodically poled nonlinear crystals, which combine pulse compression with frequency-conversion.

The dispersion in the fiber pulse stretcher and bulk optic compressor is matched to quartic order in phase by implementing fiber pulse stretchers with adjustable 2nd, 3rd and 4th order dispersion. Adjustable higher-order dispersion can be obtained by using high numerical aperture single-mode fibers with optimized refractive index profiles by itself or by using standard step-index high numerical aperture fibers in conjunction with linearly chirped fiber gratings. Alternatively, higher-order dispersion can be controlled by using the dispersive properties of the higher-order mode in a high numerical aperture few-moded fiber, by using nonlinearly chirped fiber gratings or by using linearly chirped fiber gratings in conjunction with transmissive fiber gratings. Adjustable 4th order dispersion can be obtained by controlling the chirp in fiber Bragg gratings, transmissive fiber gratings and by using fibers with different ratios of $2^{nd}$, $3^{rd}$ and $4^{th}$ order dispersion. Equally, higher-order dispersion control can be obtained by using periodically poled nonlinear crystals.

The fiber amplifiers are seeded by short pulse laser sources, preferably in the form of short pulse fiber sources. For the case of Yb fiber amplifiers, Raman-shifted and frequency doubled short pulse Er fiber laser sources can be implemented as widely tunable seed sources. To minimize the noise of frequency conversion from the 1.5 µm to the 1.0 µm regime, self-limiting Raman-shifting of the Er fiber laser pulse source can be used. Alternatively, the noise of the nonlinear frequency conversion process can be minimized by implementing self-limiting frequency-doubling, where the center wavelength of the tuning curve of the doubling crystal is shorter than the center wavelength of the Raman-shifted pulses.

The process of Raman-shifting and frequency-doubling can also be inverted, where an Er fiber laser is first frequency-doubled and subsequently Raman-shifted in an optimized fiber providing soliton-supporting dispersion for wavelengths around 800 nm and higher to produce a seed source for the 1 µm wavelength regime.

As an alternative low-complexity seed source for an Yb amplifier, a modelocked Yb fiber laser can be used. The fiber laser can be designed to produce strongly chirped pulses and an optical filter can be incorporated to select near bandwidth-limited seed pulses for the Yb amplifier.

Since parabolic pulses can be transmitted along substantial fiber length, they can also be used in fiber optic communication systems. In this, parabolic pulses can be transmitted that were generated by an external pulse source. Alternatively, parabolic pulses can also be generated in the transmission process. For the latter case, the deleterious effect of optical nonlinearities in the transmission system are generally minimized by implementing long, distributed, positive dispersion optical amplifiers. Such amplifiers can have lengths of at least 10 km and a gain of less than 10 dB/km. The total gain per amplifier should exceed 10 dB, in order to exploit the onset of parabolic pulse formation for a minimization of the deleterious effect of optical nonlinearities. Chirp compensation along the transmission lines can be conveniently implemented using chirped fiber Bragg gratings along the fiber transmission line, and also at the end of the transmission line. Optical bandwidth filters can further be implemented for bandwidth control of the transmitted pulses.

Wavelength-tunable pulse sources based on Raman-shifting of short pulses in optical fibers are useful in itself for many applications, for example in spectroscopy. However, a very attractive device can be constructed by the application of Raman-shifting to the construction of wavelength-tunable fiber Raman amplifiers for telecommunication systems. In this wavelength-tunable system, Raman-shifted pump pulses provide Raman gain for a tunable wavelength range, which is red-shifted with respect to the pump pulses. Moreover, the shape of the Raman gain spectrum can be controlled by modulating the Raman-shifted pump pulses.

BRIEF DESCRIPTION OF THE DRAWINGS

The invention will be more clearly understood from the following description in conjunction with the accompanying drawings, wherein.

DETAILED DESCRIPTION OF THE PREFERRED EMBODIMENTS

Figure 1:
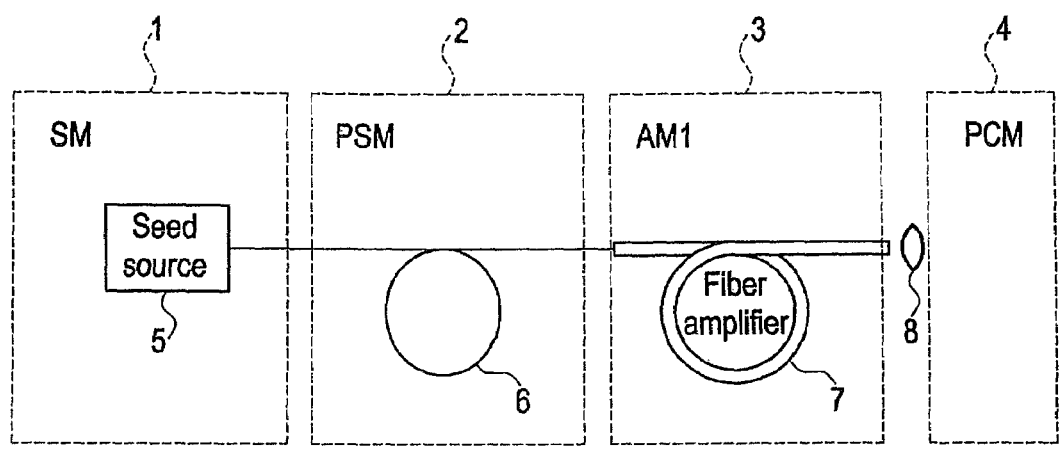
FIG. 1 is an illustration of a modular, compact, tunable system for generating high peak and high average power ultrashort laser pulses in accordance with the present invention.

A generalized illustration of the system of the invention is shown in FIG. 1. The pulses generated in a laser seed source 1 (seed module; SM) are coupled into a pulse stretcher module 2 (PSM), where they are dispersively stretched in time. The stretched pulses are subsequently coupled into the fundamental mode of a cladding-pumped Yb fiber amplifier 3 (amplifier module, AM1), where the pulses are amplified by at least a factor of 10. Finally, the pulses are coupled into a pulse compressor module 4 (PCM), where they are temporally compressed back to approximately the bandwidth limit.

The embodiment shown in FIG. 1 is modular and consists of the four sub-systems; the SM 1, PSM 2, AM 1 3 and PCM 4. The sub-systems can be used independently as well as in different configurations, as described in the alternative embodiments.

In the following, discussion is restricted to the SM-PSM-AM1-PCM system. The SM 1 preferably comprises a femtosecond pulse source (seed source 5). The PSM preferably comprises a length of fiber 6, where coupling between the SM and the PSM is preferably obtained by fusion splicing. The output of the PSM is preferably injected into the fundamental mode of the Yb amplifier 7 inside the AM 1 module 3. Coupling can be performed by either fusion splicing, a fiber coupler or a bulk-optic imaging system between PSM 2 and the fiber amplifier 7. All fibers are preferably selected to be polarization maintaining. The PCM 4 preferably consists of a dispersive delay line constructed from one or two bulk optic diffraction gratings for reasons of compactness. Alternatively, a number of bulk optic prisms and Bragg gratings can be used inside the PCM 4. Coupling to the PCM 4 can be performed by a bulk optic lens system as represented by the single lens 8 in FIG. 1. In the case of a PCM that contains fiber Bragg gratings, a fiber pig-tail can be used for coupling to the PCM.

Figure 2:
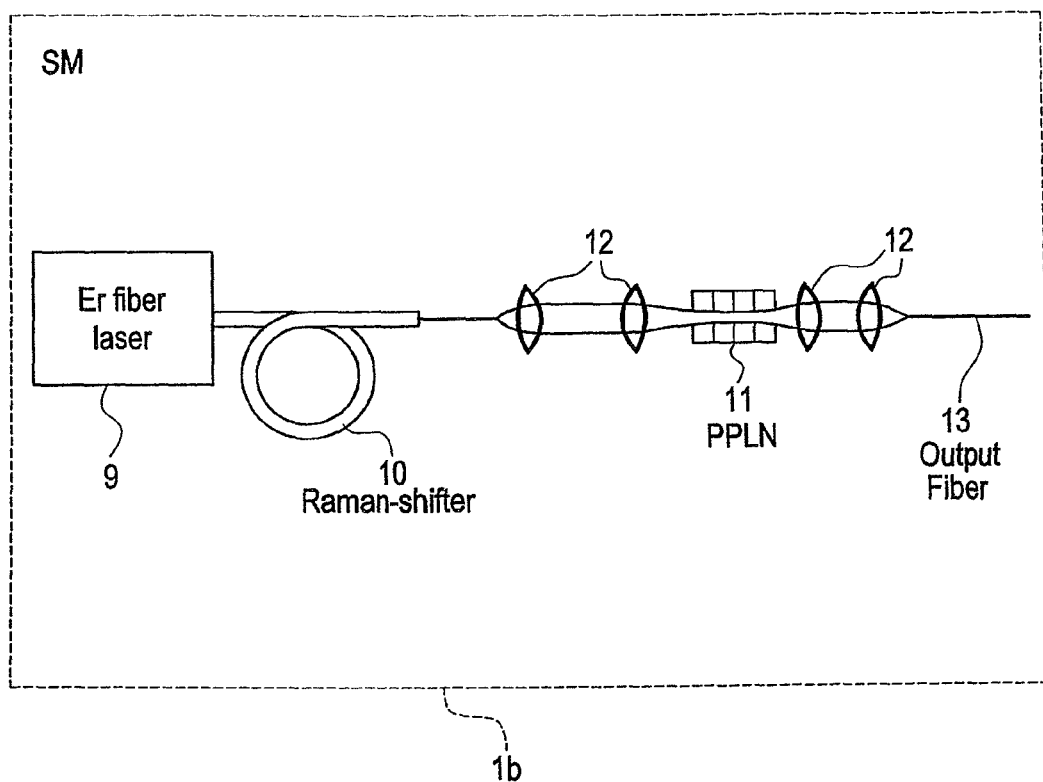
FIG. 2 is an illustration of an embodiment of a Seed Module (SM) for use in the present invention.

As an example of a femtosecond laser seed source, a Raman-shifted, frequency-doubled Er fiber laser is shown within an SM 1b in FIG. 2. The femtosecond fiber laser 9 can be a commercial high energy soliton source (IMRA America, Inc., Femtolite B-60™) delivering ≈200 fs pulses at a wavelength of 1.57 μm and a pulse energy of 1 nJ at a repetition rate of 50 MHz.

For optimum Raman-shifting from 1.5 μm to the 2.1 μm wavelength region, a reduction in the core diameter (tapering) along the length of the polarization maintaining Raman-shifting fiber 10 is introduced. A reduction of the core diameter is required to keep the 2nd order dispersion in the Raman-shifter close to zero (but negative) in the whole wavelength range from 1.5 to 2.1 μm. By keeping the absolute value of the 2nd order dispersion small, the pulse width inside the Raman shifter is minimized, which leads to a maximization of the Raman frequency shift (J. P. Gordon, "Theory of the Soliton Self-frequency Shift," Opt. Lett., 11, 662 (1986)). Without tapering, the Raman frequency-shift is typically limited to around 2.00 μm, which even after frequency-doubling is not compatible with the gain bandwidth of Yb fiber amplifiers.

In this particular example, a two-stage Raman shifter 10 consisting of 30 and 3 m lengths of silica 'Raman' fiber (single-mode at 1.56 μm) with core diameters of 6 and 4 μm respectively, was implemented. Due to the onset of the infrared absorption edge of silica at 2.0 μm, it is beneficial to increase the rate of tapering towards the end of the Raman shifter 10. In the present example, conversion efficiencies up to 25% from 1.57 μm to 2.10 μm were obtained. Even better conversion efficiencies can be obtained by using a larger number of fibers with smoothly varying core diameter, or by implementing a single tapered fiber with smoothly varying core diameter.

Frequency-conversion of the Raman-shifted pulses to the 1.05 μm region can be performed by a length of periodically poled LiNbO3 (PPLN) crystal 11 with an appropriately selected poling period. (Although throughout this specification, the preferable material for frequency conversion is indicated as PPLN, it should be understood that other periodically-poled ferroelectric optical materials such as PP lithium tantalate, PP MgO:LiNbO$_3$, PP KTP, or other periodically poled crystals of the KTP isomorph family can also be advantageously used.) Coupling with the PPLN crystal 11 occurs through the use of a lens system, represented in FIG. 2 by lenses 12. The output of the PPLN crystal 11 is coupled by lenses 12 into output fiber 13. Conversion efficiencies as high as 16% can so be obtained for frequency-doubling of 2.1 μm resulting in a pulse energy up to 40 pJ in the 1 μm wavelength region. The spectral width of the frequency-converted pulses can be selected by an appropriate choice of the length of the PPLN crystal 11; for example a 13 mm long PPLN crystal produces a bandwidth of 2 nm in the 1.05 μm region corresponding to a pulse width of around 800 fs. The generated pulse width is approximately proportional to the PPLN crystal length, i.e., a frequency converted pulse with a 400 fs pulse width requires a PPLN length of 6.5 mm. This pulse width scaling can be continued until the frequency-converted pulse width reaches around 100 fs, where the limited pulse width of 100 fs of the Raman-shifted pulses limits further pulse width reduction.

In addition, when the frequency-converted pulse width is substantially longer than the pulse width of the Raman-shifted pulses, the wide bandwidth of the Raman-pulses can be exploited to allow for wavelength-tuning of the frequency-converted pulses, i.e., efficient frequency conversion can be obtained for pulses ranging in frequency from $2(\omega_1-\delta\omega)$ to $2(\omega_1+\delta\omega)$, where $2\delta\omega$ is the spectral width at half maximum of the spectrum of the Raman-shifted pulses. Continuous wavelength tuning here is simply performed by tuning the temperature of the frequency-conversion crystal 11.

The amplified noise of the Raman-shifter, PPLN-crystal combination is minimized as follows. Self-limiting Raman-shifting of the Er fiber laser pulse source can be used by extending the Raman shift out to larger than 2 μm in silica-based optical fiber. For wavelengths longer than 2 μm, the infrared absorption edge of silica starts to significantly attenuate the pulses, leading to a limitation of the Raman shift and a reduction in amplitude fluctuations, i.e., any increase in pulse energy at 1.5 μm tends to translate to a larger Raman-shift and thus to a greater absorption in the 2 μm wavelength region, which thus stabilizes the amplitude of the Raman-shifted pulses in this region.

Alternatively, the noise of the nonlinear frequency conversion process can be minimized by implementing self-limiting frequency-doubling, where the center wavelength of the tuning curve of the doubling crystal is shorter than the center wavelength of the Raman-shifted pulses. Again, any increase in pulse energy in the 1.5 μm region translates into a larger Raman-shift, producing a reduced frequency conversion efficiency, and thus the amplitude of the frequency-doubled pulses is stabilized. Therefore a constant frequency-converted power can be obtained for a large variation in input power.

Figure 3:
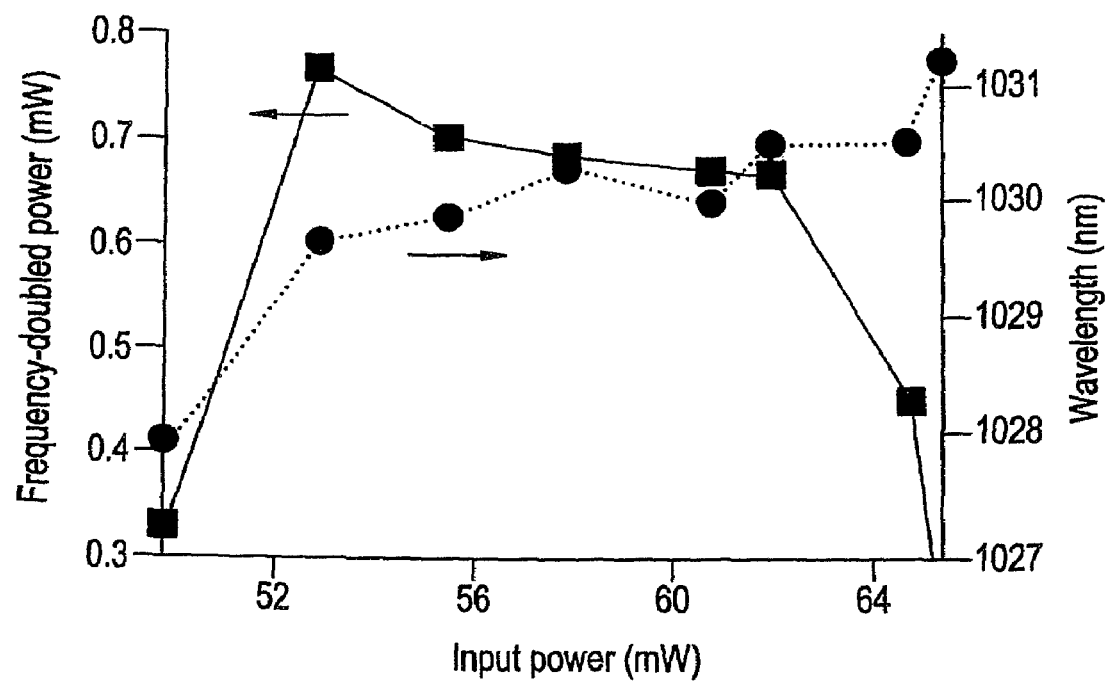
FIG. 3 is a diagram graphically illustrating the relationship between the average frequency-doubled power and wavelength which are output at a given range of input power according to one embodiment of the present invention.

This is illustrated in FIG. 3, where the average frequency-converted power in the 1 μm wavelength region as a function of average input power at 1.56 μm is shown. Self-limiting frequency-doubling also ensures that the frequency-shifted wavelength in the 1 μm wavelength region is independent of average input power in the 1.56 μm wavelength region, as also demonstrated in FIG. 3.

Figure 4:
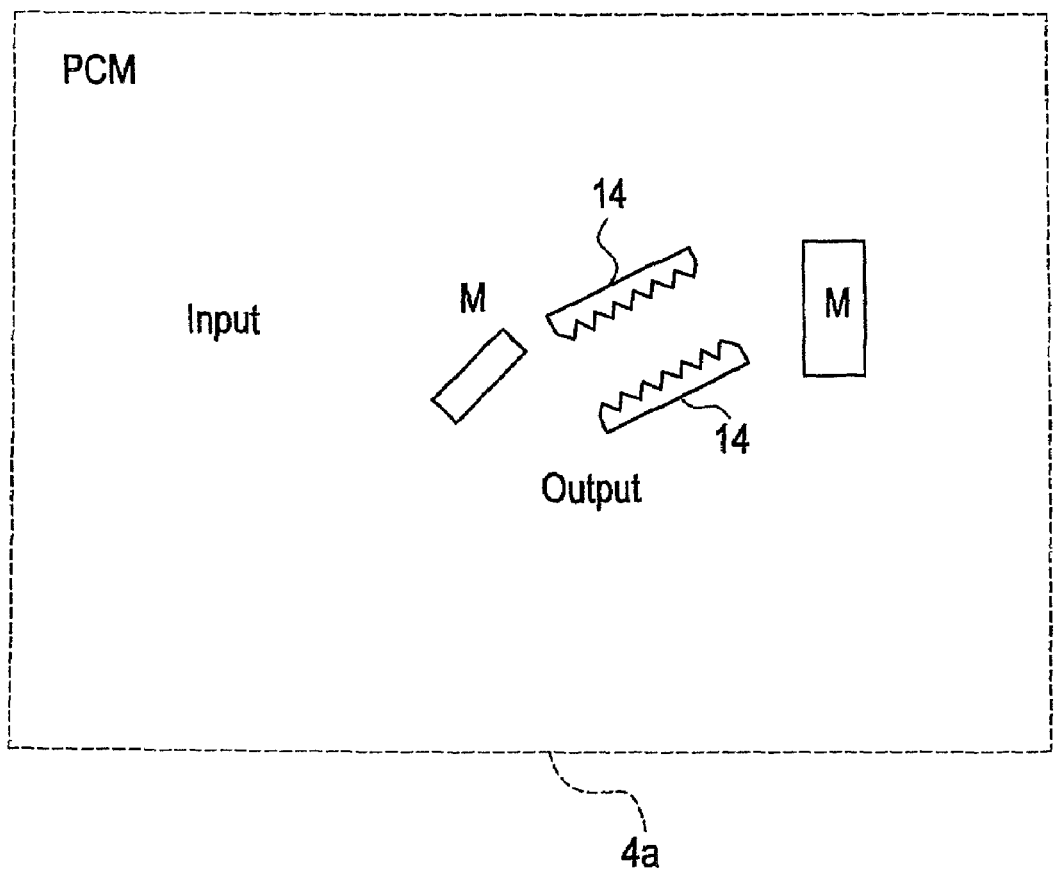
FIG. 4 is an illustration of an embodiment of a Pulse Compressor Module (PCM) for use with the present invention.

Several options exist for the PSM 2. When a length of fiber 6 (stretching fiber) is used as a PSM as shown in FIG. 1, an appropriate dispersive delay line can then be used in the PCM 4 to obtain near bandwidth-limited pulses from the system. However, when the dispersive delay line in the PCM 4 consists of bulk diffraction gratings 14 as shown in FIG. 4, a possible problem arises. The ratio of $|3^{rd}/2^{nd}|$-order dispersion is typically 1-30 times larger in diffraction grating based dispersive delay lines compared to the ratio of $|3^{rd}/2^{nd}|$-order dispersion in typical step-index optical fibers operating in the 1 μm wavelength region. Moreover, for standard step-index fibers with low numerical apertures operating in the 1 μm wavelength regime, the sign of the third-order dispersion in the fiber is the same as in a grating based dispersive delay line. Thus a fiber stretcher in conjunction with a grating-based stretcher does not typically provide for the compensation of $3^{rd}$ and higher-order dispersion in the system.

For pulse stretching by more than a factor of 10, the control of third-order and higher-order dispersion becomes important for optimal pulse compression in the PCM 4. To overcome this problem, the stretcher fiber 6 in the PSM 2 can be replaced with a length of fibers with W-style multi-clad refractive index profiles, i.e., 'W-fibers' (B. J. Ainslie et al.) or holey fibers (T. M. Monroe et al., 'Holey Optical Fibers' An Efficient Modal Model, J. Lightw. Techn., vol. 17, no. 6, pp. 1093-1102). Both W-fibers and holey fibers allow adjustable values of 2nd, 3rd and higher-order dispersion. Due to the small core size possible in W and holey fibers, larger values of 3rd order dispersion than in standard single-mode fibers can be obtained. The implementation is similar to the one shown in FIG. 1 and is not separately displayed. The advantage of such systems is that the PSM can work purely in transmission, i.e., it avoids the use of dispersive Bragg gratings operating in reflection, and can be spliced into and out of the system for different system configurations.

Figure 5:
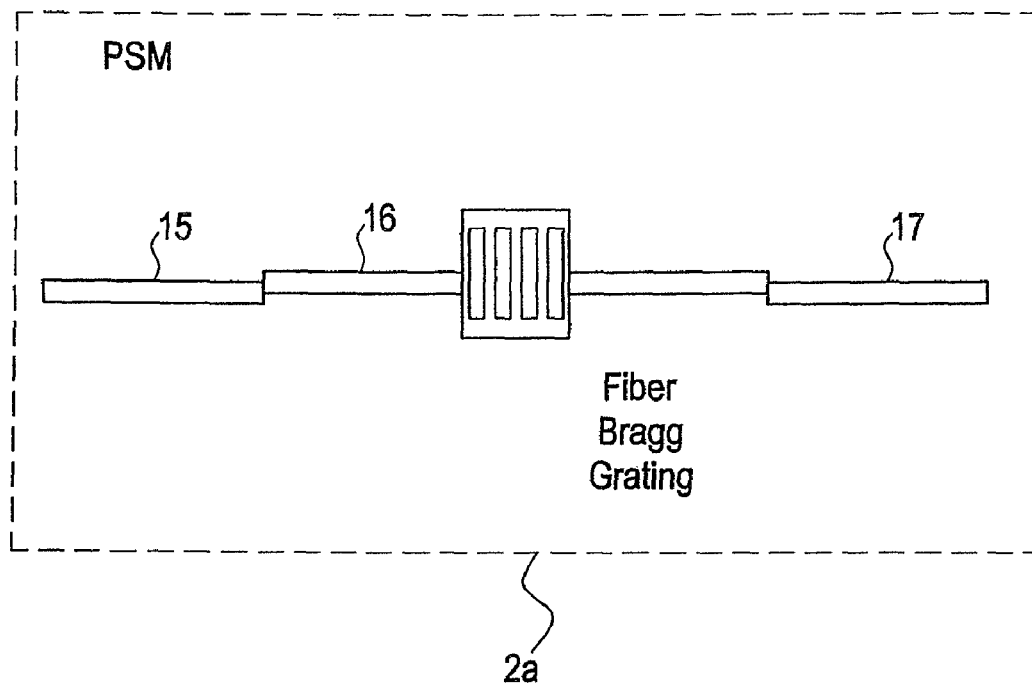
FIG. 5 is an illustration of an embodiment of a Pulse Stretcher Module (PSM) for use with the present invention.

An alternative PSM 2 with adjustable values of $2^{nd}$, $3^{rd}$ and $4^{th}$ order dispersion is shown in FIG. 5. The PSM 20a is based on the principle that conventional step-index optical fibers can produce either positive, zero or negative 3rd order dispersion. The highest amount of 3rd order dispersion in a fiber is produced by using its first higher-order mode, the $LP_{11}$ mode near cut-off. In FIG. 5, the $4^{th}$ and $3^{rd}$ order dispersion of the PSM 20a is adjusted by using three sections 15, 16, 17 of pulse stretching fiber. The 1st stretcher fiber 15 can be a length of fiber with zero $3^{rd}$-order and appropriate $4^{th}$-order dispersion. The 1st stretcher fiber 15 is then spliced to the $2^{nd}$ stretcher fiber 16, which is selected to compensate for the $3^{rd}$-order dispersion of the grating compressor as well as the whole chirped-pulse amplification system. To take advantage of the high $3^{rd}$-order dispersion of the $LP_{11}$ mode the 1st stretcher fiber 15 is spliced to the $2^{nd}$ stretcher fiber 16 with an offset in their respective fiber centers, leading to a predominant excitation of the $LP_{11}$ mode in the 2nd stretcher fiber 16. To maximize the amount of 3rd-order dispersion in the 2nd stretcher fiber 16, a fiber with a high numerical aperture NA>0.20 is preferred. At the end of the 2nd stretcher fiber 16, a similar splicing technique is used to transfer the $LP_{11}$ mode back to the fundamental mode of the $3^{rd}$ stretcher fiber 17. By an appropriate choice of fibers, the 4th-order dispersion of the whole amplifier compressor can be minimized. The $3^{rd}$ stretcher fiber 17 can be short with negligible dispersion.

The transfer loss of the whole fiber stretcher assembly is at least 25% due to the unavoidable 50% or greater loss incurred by transferring power from the $LP_{11}$ mode to the $LP_{01}$ mode without the use of optical mode-converters. Any residual energy in the $LP_{01}$ mode in the 2nd stretcher fiber can be reflected with an optional reflective fiber grating 18 as shown in FIG. 5. Due to the large difference in effective index between the fundamental and the next higher-order mode, the grating resonance wavelength varies between 10-40 nm between the two modes, allowing for selective rejection of one mode versus the other for pulses with spectral widths between 10-40 nm.

The energy loss of the fiber stretcher assembly can be made to be insignificant by turning the $3^{rd}$ stretcher fiber 17 into an Yb amplifier. This implementation is not separately shown.

When 4th-order dispersion is not significant, the 1st stretcher fiber 15 can be omitted. $4^{th}$ order dispersion can also be compensated by using a 1st stretcher fiber with non-zero $3^{rd}$ order dispersion, as long as the ratio of $3^{rd}$ and $4^{th}$ order dispersion is different between the $1^{st}$ and $2^{nd}$ stretcher fiber.

The Yb-doped fiber inside the AM1 3 can have an Yb doping level of 2.5 mole % and a length of 5 m. Both single-mode and multi-mode Yb-doped fiber can be used, where the core diameter of the fiber can vary between 1-50 µm; though the fundamental mode should be excited in case of a MM fiber to optimize the spatial quality of the output beam. Depending on the amount of required gain, different lengths of Yb-doped fiber can be used. To generate the highest possible pulse energies, Yb fiber lengths as short as 1 m can be implemented.

Pulse compression is performed in the PCM 4. The PCM 4 can contain conventional bulk optic components (such as the bulk diffraction grating pair shown in FIG. 4), a single grating compressor, or a number of dispersive prisms or grisms or any other dispersive delay line.

Alternatively, a fiber or bulk Bragg grating can be used, or a chirped periodically poled crystal. The chirped periodically poled crystal combines the functions of pulse compression and frequency doubling (A. Galvanauskas, et al., 'Use of chirped quasi-phase matched materials in chirped pulse amplification systems,' U.S. application Ser. No. 08/822,967, the contents of which are hereby incorporated herein by reference) and operates in transmission providing for a uniquely compact system.

Other modifications and variations to the invention will be apparent to those skilled in the art from the foregoing disclosure and teachings.

In particular, the SM 1 can be used as a stand-alone unit to produce near bandwidth limited femtosecond pulses in the frequency range from 1.52-2.2 µm, and after frequency conversion in a nonlinear crystal also in the frequency range from 760 nm to 1.1 µm. The frequency range can be further extended by using a fluoride Raman-shifting fiber or other optical fibers with infrared absorption edges longer than silica. Using this technique wavelengths up to around 3-5 µm can be reached. In conjunction with frequency-doubling, continuous tuning from 760 nm to 5000 nm can be achieved. The pulse power in the 2 µm region can be further enhanced by using Tm or Ho-doped fiber. With such amplifiers, near bandwidth-limited Raman-soliton pulses with pulse energies exceeding 10 nJ can be reached in single-mode fibers in the 2 µm wavelength region. After frequency-doubling, femtosecond pulses with energies of several nJ can be obtained in the 1 µm region without the use of any dispersive pulse compressors. Such pulses can be used as high energy seed pulses for large-core multi-mode Yb amplifiers, which require higher seed pulse energies than single-mode Yb amplifiers to suppress amplified spontaneous emission.

Figure 6:
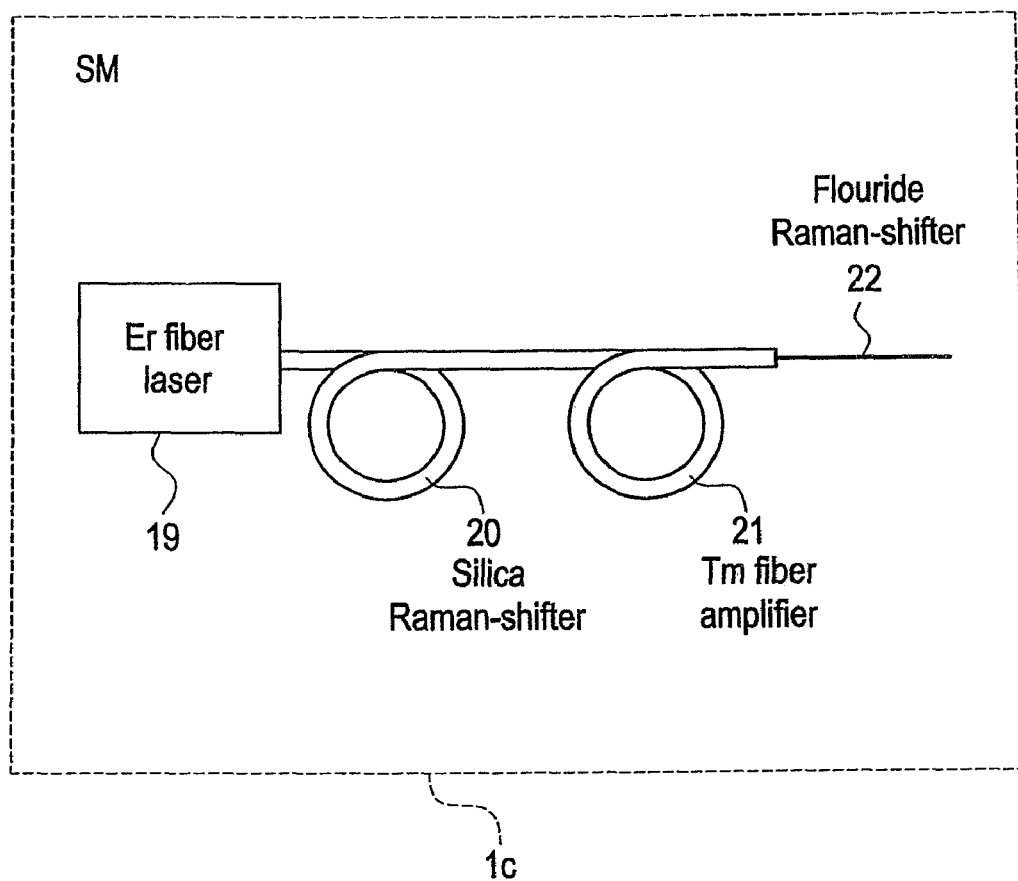
FIG. 6 is an illustration of a second embodiment of a Seed Module (SM) for use with the present invention.

An example of an ultra-wide tunable fiber source combining an Er-fiber laser pulse source 19 with a silica Raman-shifter 20, a Tm-doped amplifier 21 and a $2^{nd}$ fluoride glass based Raman shifter 22 is shown in the SM 1c of FIG. 6. An optional frequency-doubler is not shown; for optimum stability all fibers should be polarization maintaining. As another alternative to the Er-fiber laser pulse source a combination of a diode-laser pulse source with an Er-amplifier can be used; this is not separately shown.

Figure 7:
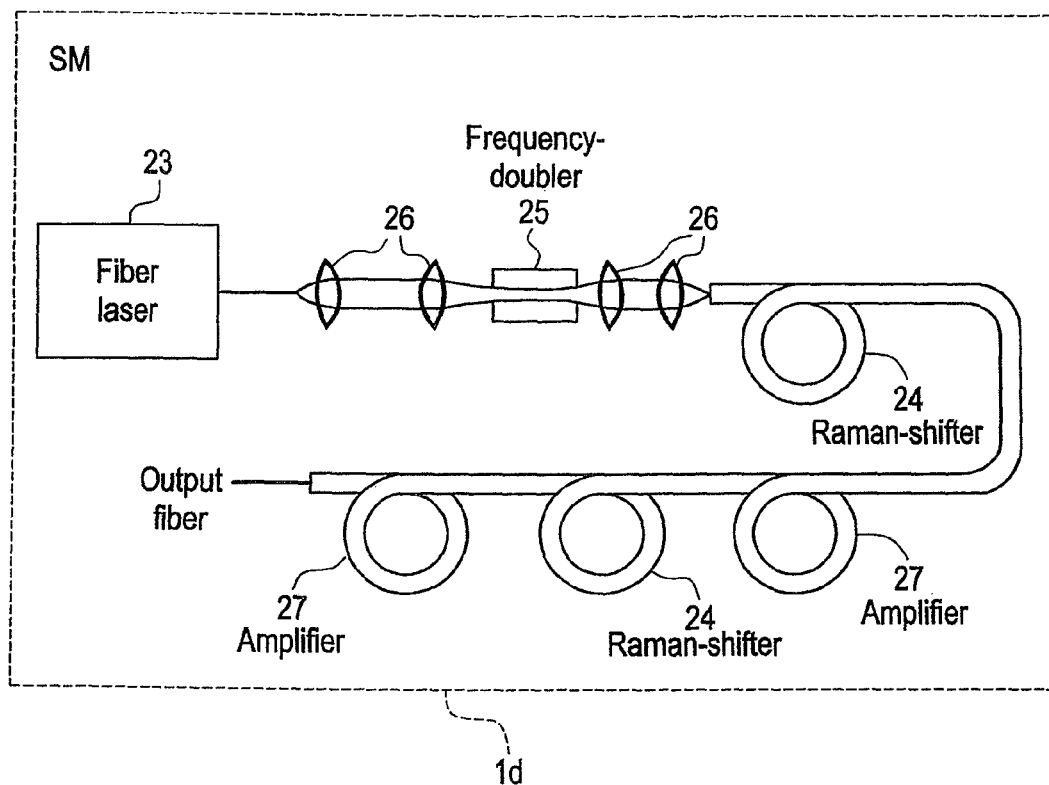
FIG. 7 is an illustration of a third embodiment of a Seed Module (SM) for use with the present invention.

As yet another alternative for a SM, SM 1d is shown in FIG. 7, and contains a frequency-doubled high-power passively mode-locked Er or Er % Yb-fiber oscillator 23 in conjunction with a length of Raman-shifting holey fiber 24. Here the pulses from the oscillator 23 operating in the 1.55 µm wavelength region are first frequency-doubled using frequency doubler 25 and lens system 26, and subsequently the frequency-doubled pulses are Raman-shifted in a length of holey fiber 24 that provides soliton supporting dispersion for wavelengths longer than 750 nm or at least longer than 810 nm. By amplifying the Raman-shifted pulses in the 1 µm wavelength regime or in the 1.3, 1.5, or 2 µm wavelength regime and by selecting different designs of Raman-shifting fibers, a continuously tunable source operating in the wavelength region from around 750 nm to 5000 nm can be constructed. The design of such a source with a number of attached amplifiers 27 is also shown in FIG. 7.

For optimum Raman self-frequency shift, the holey fiber dispersion should be optimized as a function of wavelength. The absolute value of the 3rd order dispersion of the holey fiber should be less than or equal to the absolute value of the 3rd order material dispersion of silica. This will help ensure that the absolute value of the 2nd order dispersion remains small over a substantial portion of the wavelength tuning range. Moreover the value of the 2nd order dispersion should be negative, and a 2nd order dispersion zero should be within 300 nm in wavelength to the seed input wavelength.

As yet another alternative for a seed source for an Yb amplifier, anti-Stokes generation in a length of anti-Stokes fiber can be used. After anti-Stokes generation, additional lengths of fiber amplifiers and Raman-shifters can be used to construct a widely wavelength-tunable source. A generic configuration is similar to the one shown in FIG. 7, where the frequency-doubling means 25 are omitted and the Raman-shifter means 24 are replaced with an anti-Stokes generation means. For example, to effectively generate light in the 1.05 μm wavelength regime in an anti-Stokes generation means using an Er fiber laser seed source operating at 1.55 μm, an anti-Stokes generation means in the form of an optical fiber with small core diameter and a low value of $3^{rd}$ order dispersion is optimum. A low value of $3^{rd}$ order dispersion is here defined as a value of $3^{rd}$ order dispersion smaller in comparison to the value of $3^{rd}$ order dispersion in a standard telecommunication fiber for the 1.55 wavelength region. Moreover, the value of the $2^{nd}$ order dispersion in the anti-Stokes fiber should be negative.

Figure 8:
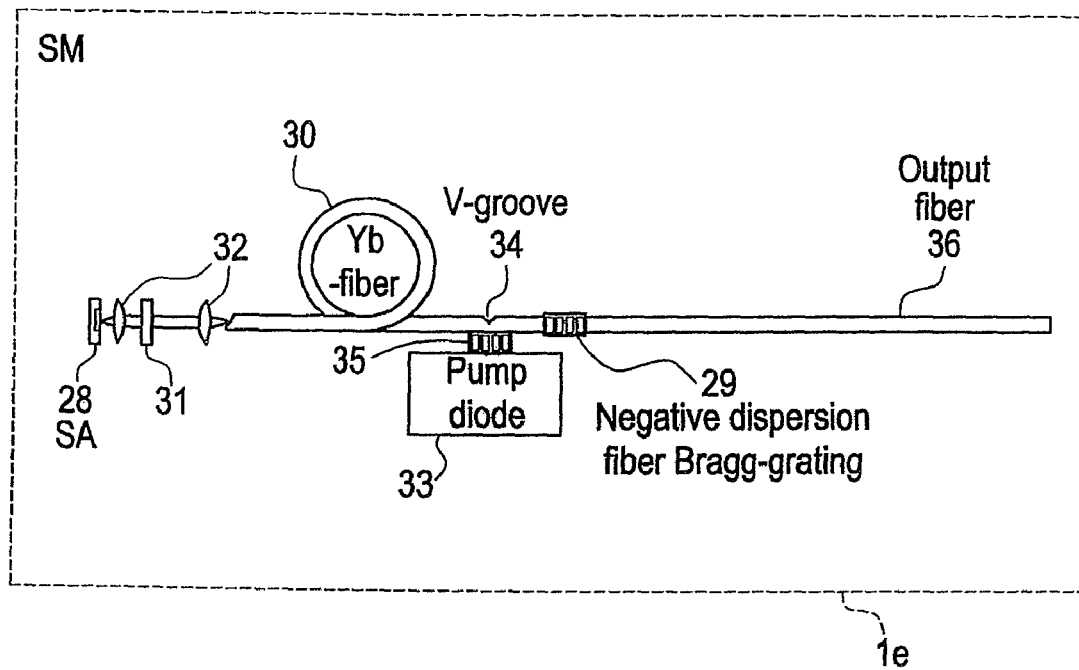
FIG. 8 is an illustration of a fourth embodiment of a Seed Module (SM) for use with the present invention.

As yet another alternative seed-source for an Yb amplifier, a passively modelocked Yb or Nd fiber laser can be used inside the SM. Preferably an Yb soliton oscillator operating in the negative dispersion regime can be used. To construct an Yb soliton oscillator, negative cavity dispersion can be introduced into the cavity by an appropriately chirped fiber grating 29, which is connected to output fiber 36 as shown in FIG. 8; alternatively, negative dispersion fiber such as holey fiber (T. Monroe et al.) can be used in the Yb soliton laser cavity. A SM incorporating such an arrangement is shown as SM 1e in FIG. 8. Here the Yb fiber 30 can be polarization maintaining and a polarizer 31 can be incorporated to select oscillation along one axis of the fiber (coupling being accomplished with lenses 32). For simplicity, the Yb fiber 30 can be cladding pumped from the side as shown in FIG. 8. However, a passively modelocked Yb fiber laser incorporating conventional single-mode fiber can also be used. Such an arrangement is not separately shown. In FIG. 8, SA 28 is used to induce the formation of short optical pulses. The grating 35 is used for dispersive control, and as an intra-cavity mirror. The pump diode 33 delivers pump light through V-groove 34.

An arrangement incorporating a holey fiber can be nearly identical to the system displayed in FIG. 8, where an additional length of holey fiber is spliced anywhere into the cavity. In the case of incorporating a holey fiber, the fiber Bragg grating does not need to have negative dispersion; equally the Bragg grating can be replaced with a dielectric mirror.

Figure 9:
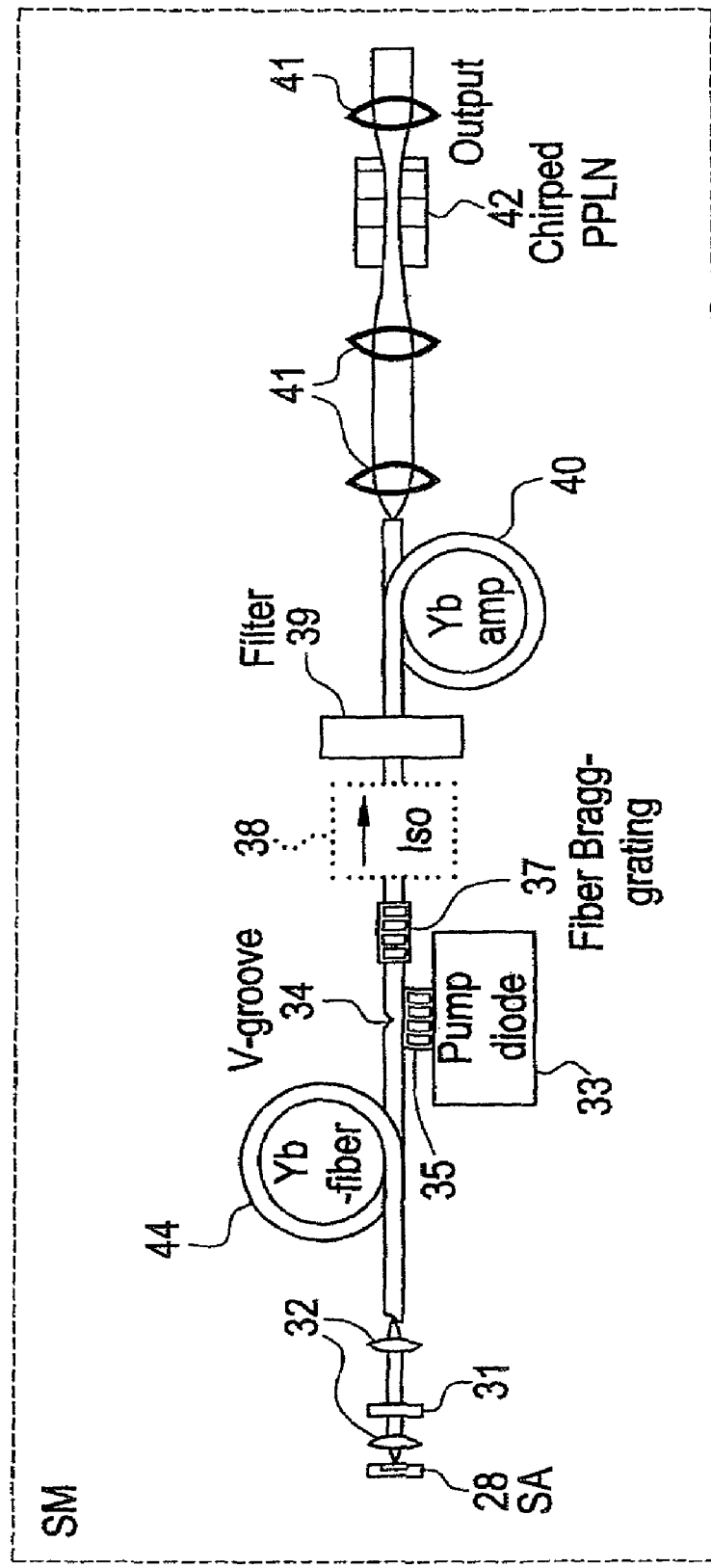
FIG. 9 is an illustration of a fifth embodiment of a Seed Module (SM) for use with the present invention.

Most straight-forward to implement, however, is an Yb oscillator operating in the positive dispersion regime, which does not require any special cavity components such as negative dispersion fiber Bragg gratings or holey fiber to control the cavity dispersion. In conjunction with a 'parabolic' Yb amplifier (or ordinary Yb amplifier), a very compact seed source for a high-power Yb amplifier system can be obtained. Such a Yb oscillator with an Yb amplifier 40 is shown in FIG. 9, where preferably the Yb amplifier 40 is a 'parabolic' Yb amplifier as discussed below. Elements which are identical to those in FIG. 8 are identically numbered.

The SM 1f in FIG. 9 comprises a side-pumped Yb amplifier 40 as described with respect to FIG. 8, though any other pumping arrangement could also be implemented. The Yb fiber 44 is assumed to be polarization maintaining and a polarizer 31 is inserted to select a single polarization state. The fiber Bragg grating 37 has a reflection bandwidth small compared to the gain bandwidth of Yb and ensures the oscillation of pulses with a bandwidth small compared to the gain bandwidth of Yb. The Bragg grating 37 can be chirped or unchirped. In the case of an unchirped Bragg grating, the pulses oscillating inside the Yb oscillator are positively chirped. Pulse generation or passive modelocking inside the Yb oscillator is initiated by the saturable absorber 28. The optical filter 39 is optional and further restricts the bandwidth of the pulses launched into the Yb amplifier 40.

To optimize the formation of parabolic pulses inside the Yb amplifier 40 inside the SM 1f, the input pulses should have a bandwidth small compared to the gain bandwidth of Yb; also the input pulse width to the Yb amplifier 40 should be small compared to the output pulse width and the gain of the Yb amplifier 40 should be as high as possible, i.e., larger than 10. Also, gain saturation inside the Yb amplifier 40 should be small.

As an example of a parabolic amplifier a Yb amplifier of 5 m in length can be used. Parabolic pulse formation is ensured by using a seed source with a pulse width of around 0.2-1 ps and a spectral bandwidth on the order of 3-8 nm. Parabolic pulse formation broadens the bandwidth of the seed source to around 20-30 nm inside the Yb amplifier 40, whereas the output pulses are broadened to around 2-3 ps. Since the chirp inside parabolic pulses is highly linear, after compression pulse widths on the order of 100 fs can be obtained. Whereas standard ultrafast solid state amplifiers can tolerate a nonlinear phase shift from self-phase modulation only as large as pi (as well known in the state of the art), a parabolic pulse fiber amplifier can tolerate a nonlinear phase shift as large as 10*pi and higher. For simplicity, we thus refer to a large gain Yb amplifier as a parabolic amplifier. Parabolic amplifiers obey simple scaling laws and allow for the generation of parabolic pulses with spectral bandwidths as small as 1 nm or smaller by an appropriate increase of the amplifier length. For example, a parabolic pulse with a spectral bandwidth of around 2 nm can be generated using a parabolic amplifier length of around 100 m.

Since a parabolic pulse can tolerate large values of self-modulation and a large amount of spectral broadening without incurring any pulse break up, the peak power capability of a parabolic amplifier can be greatly enhanced compared to a standard amplifier. This may be explained as follows. The time dependent phase delay $\Phi_{n1}(t)$ incurred by self-phase modulation in an optical fiber of length L is proportional to peak power, i.e.

$$\Phi_{n1}(t)=\gamma P(t)L,$$

where P(t) is the time dependent peak power inside the optical pulse. The frequency modulation is given by the derivative of the phase modulation, i.e., $\delta\omega=\gamma L[\partial P(t)/\partial t]$. For a pulse with a parabolic pulse profile $P(t)=P_0[1-(t/t_0)^2]$, where $(-t_0<t<t_0)$, the frequency modulation is linear. It may then be shown that indeed the pulse profile also stays parabolic, thus allowing the propagation of large peak powers with only a resultant linear frequency modulation and the generation of a linear pulse chirp.

The chirped pulses generated with the Yb amplifier 40 can be compressed using a diffraction grating compressor as shown in FIG. 4. Alternatively, a chirped periodically poled crystal 42 and lenses 41 could be used for pulse compression as also shown in FIG. 9. In conjunction with the SM 1f shown in FIG. 9 a very compact stand-alone source of femtosecond pulses in the green spectral region around 530 nm can be obtained.

In addition to the passively modelocked Yb fiber laser 44 shown in FIG. 9, alternative sources could also be used to seed the Yb amplifier. These alternative sources can comprise Raman-shifted Er or Er/Yb fiber lasers, frequency-shifted Tm or Ho fiber lasers and also diode laser pulse sources. These alternative implementations are not separately shown.

Figure 10:
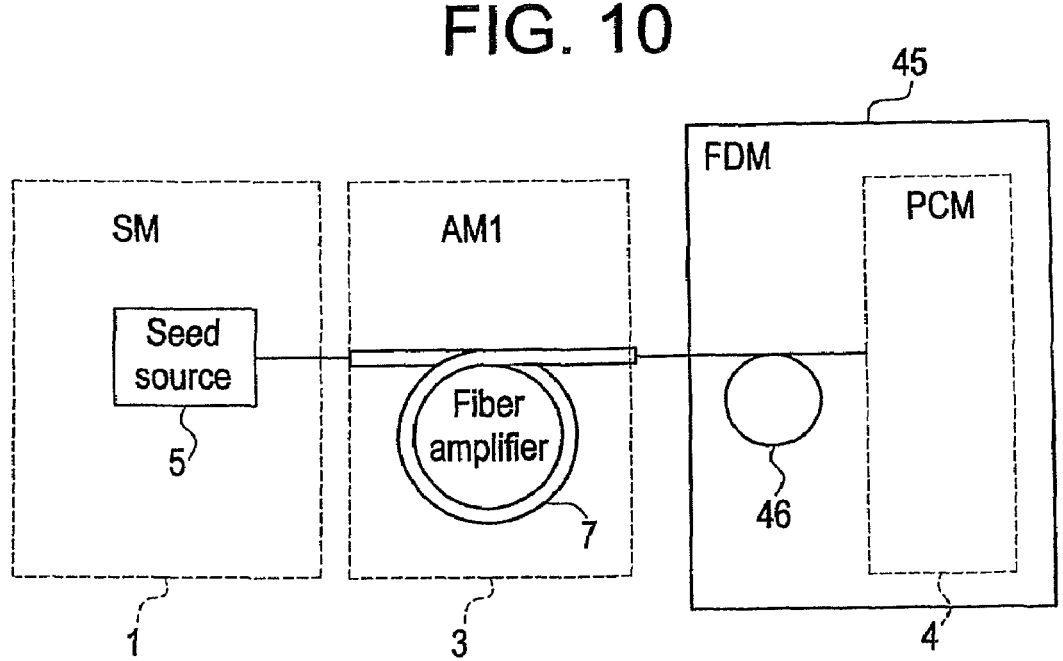
FIG. 10 is an illustration of an embodiment of the present invention in which a Fiber Delivery Module (FDM) is added to the embodiment of the invention shown in FIG. 1.

In FIG. 10 a fiber delivery module (FDM) 45 is added to the basic system shown in FIG. 1. The PSM 2 is omitted in this case; however, to expand the peak power capability of the amplifier module a PSM 2 can be included when required. The Yb amplifier 7 shown in FIG. 10 can be operated both in the non-parabolic or the parabolic regime.

In its simplest configuration, the FDM 45 consists of a length of optical fiber 46 (the delivery fiber). For a parabolic amplifier, the delivery fiber 46 can be directly spliced to the Yb amplifier 7 without incurring any loss in pulse quality. Rather, due to the parabolic pulse profile, even for large amounts of self-phase modulation, an approximately linear chirp is added to the pulse allowing for further pulse compression with the PCM 4. The PCM 4 can be integrated with the FDM 45 by using a small-size version of the bulk diffraction grating compressor 14 shown in FIG. 4 in conjunction with a delivery fiber. In this case the delivery fiber in conjunction with an appropriate collimating lens would replace the input shown in FIG. 4. A separate drawing of such an implementation is not shown. However, the use of the PCM 4 is optional and can for example be omitted, if chirped output pulses are required from the system. In conjunction with a PCM 4, the system described in FIG. 10 constitutes a derivative of a chirped pulse amplification system, where self-phase modulation as well as gain is added while the pulse is dispersively broadened in time. The addition of self-phase modulation in conventional chirped pulse amplification systems typically leads to significant pulse distortions after pulse compression. The use of parabolic pulses overcomes this limitation.

Advanced fiber optic communication systems can also be interpreted as chirped pulse amplification systems (see, e.g., D. J. Jones et al., IEICE Trans. Electron., E81-C, 180 (1998)). Clearly, the minimization of pulse distortions by parabolic pulses is equally relevant in optical communication systems.

Figure 11:
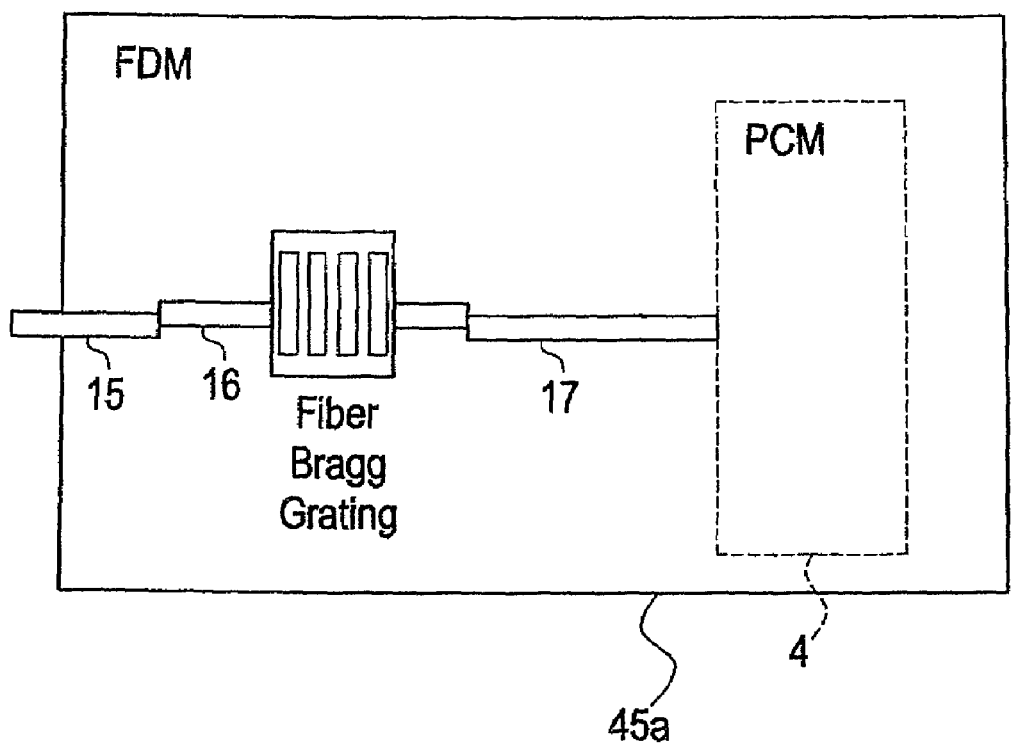
FIG. 11 is an illustration of an embodiment of a Fiber Delivery Module (FDM) for use with the present invention.

To obtain pulse widths shorter than 50 fs, the control of third order and higher-order dispersion in a FDM module or in an optional PSM becomes significant. The control of higher-order dispersion with a PSM was already discussed with reference to FIGS. 1 and 5; the control of higher-order dispersion in a FDM is very similar and discussed with an exemplary embodiment of the FDM 45a shown in FIG. 11. Just as in FIG. 1, the large third-order dispersion of a W-fiber can be used to compensate for the third-order dispersion of a bulk PCM 4. Just as in FIG. 5, by using fibers 15, 16, 17 with different values for higher-order dispersion in the FDM, the higher order dispersion of the whole system including a PCM 4 consisting of bulk diffraction gratings may be compensated.

Figure 12:
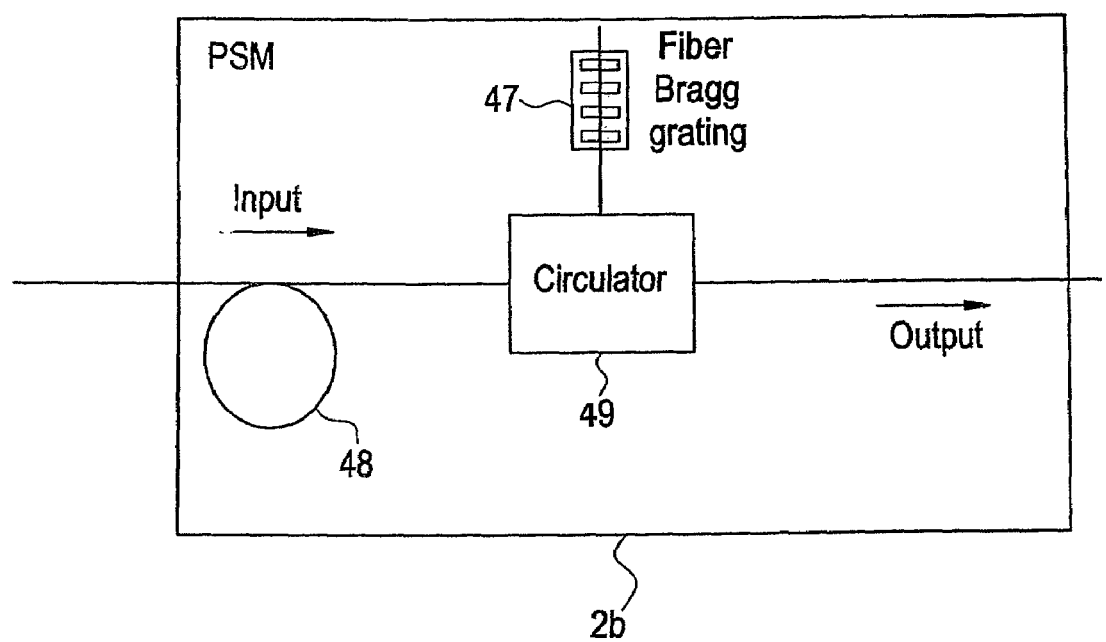
FIG. 12 is an illustration of a second embodiment of a Pulse Stretcher Module (PSM) for use with the present invention.
Figure 13:
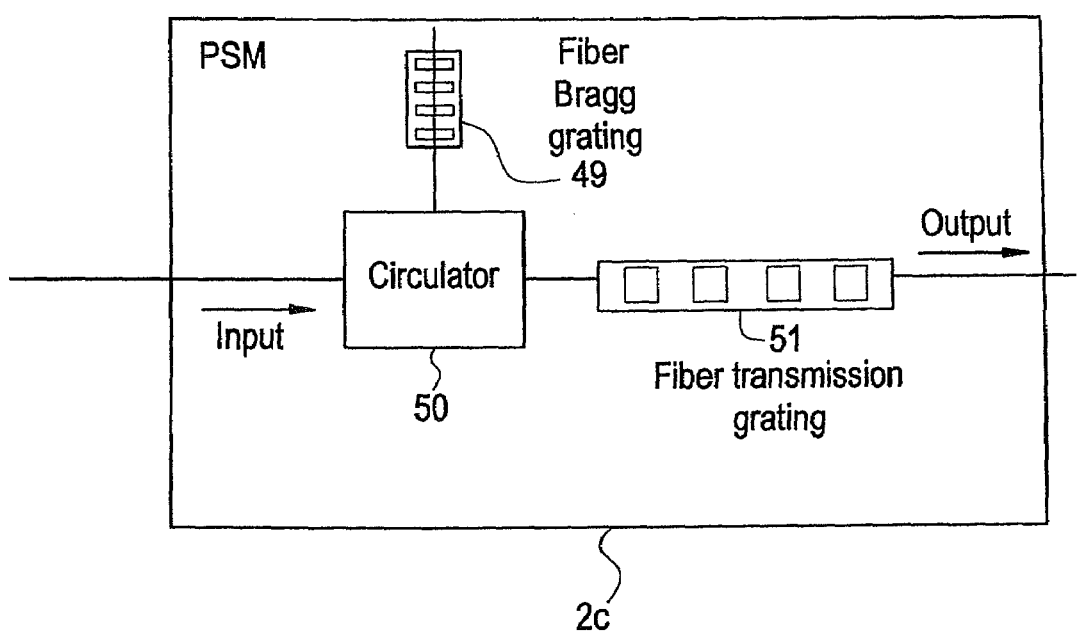
FIG. 13 is an illustration of a third embodiment of a Pulse Stretcher Module (PSM) for use with the present invention.

Alternative embodiments of PSMs are shown in FIGS. 12 and 13, which are also of practical value as they allow the use of commercially available linearly chirped fiber Bragg gratings in the PSM, while compensating for higher-order dispersion of a whole chirped-pulse amplification system comprising PSM as well as PCM. As another alternative, nonlinearly chirped fiber Bragg gratings can also be used in the PSM to compensate for the dispersion of the PCM. Such an arrangement is not separately shown.

To avoid the use of W-fibers or the $LP_{11}$ mode in the PSM, an alternative embodiment of a PSM as shown in FIG. 12 is shown as PSM 2b. Here a negatively linearly chirped Bragg grating 47 is used in conjunction with a single-mode stretcher fiber 48 with negative third-order dispersion and circulator 49. The introduction of the negative linearly chirped Bragg grating increases the ratio of ($3^{rd}/2^{nd}$)-order dispersion in the PSM 2b, allowing for the compensation of the high value of $3^{rd}$ order dispersion in the PCM 4, when a bulk diffraction grating compressor is used. The PSM 2b can also contain W-fibers in conjunction with a linearly chirped fiber Bragg grating to further improve the flexibility of the PSM.

As yet another alternative embodiment of a PSM for the compensation of higher-order dispersion the arrangement in FIG. 13 is shown as PSM 2c, comprising a positively linearly chirped fiber Bragg grating 49, circulator 50 and another fiber transmission grating 51. Here the positively linearly chirped fiber Bragg grating 49 produces positive 2nd order dispersion and the other fiber transmission grating 51 produces an appropriate amount of additional $2^{nd}$ $3^{rd}$ and $4^{th}$ order dispersion, to compensate for the linear and higher order dispersion inside the PCM module. More than one fiber transmission grating or fiber Bragg grating can be used to obtain the appropriate value of $3^{rd}$ and $4^{th}$ and possibly even higher-order dispersion.

Figure 14:
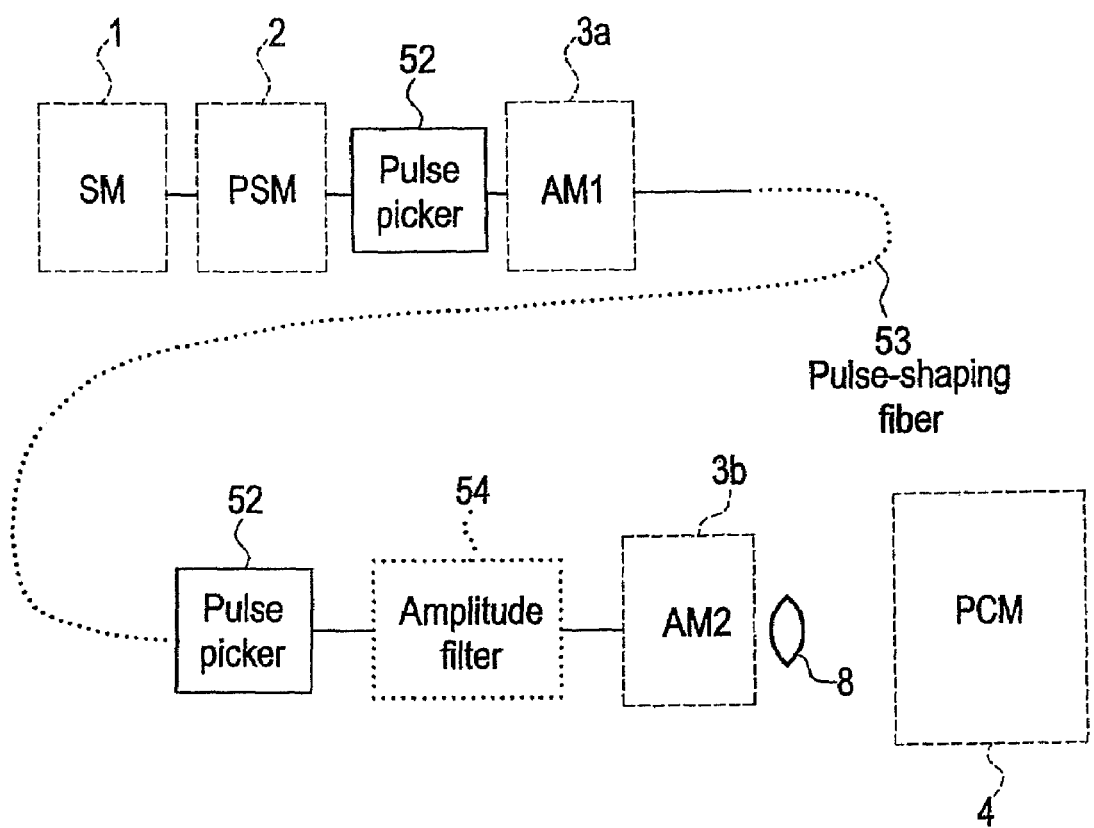
FIG. 14 is an illustration of an embodiment of the present invention in which pulse picking elements and additional amplification stages are added.

To increase the amplified pulse energy from an Yb amplifier to the mJ range and beyond, pulse picking elements and further amplification stages can be implemented as shown in FIG. 14. In this case, pulse pickers 52 are inserted in between the PSM 2 and the $1^{st}$ amplifier module AM1 3a, as well as between the 1st amplifier stage AM1 3a and $2^{nd}$ amplifier stage AM2 3b. Any number of amplifiers and pulse pickers can be used to obtain the highest possible output powers, where the final amplifier stages preferably consist of multimode fibers. To obtain a diffraction limited output the fundamental mode in these multi-mode amplifiers is selectively excited and guided using well-known techniques (M. E. Fermann et al., U.S. Pat. No. 5,818,630). The pulse pickers 52 are typically chosen to consist of optical modulators such as acousto-optic or electro-optic modulators. The pulse pickers 52 down-count the repetition rate of the pulses emerging from the SM 1 by a given value (e.g. from 50 MHz to 5 KHz), and thus allow the generation of very high pulse energies while the average power remains small. Alternatively, directly switchable semiconductor lasers could also be used to fix the repetition rate of the system at an arbitrary value. Further, the pulse pickers 52 inserted in later amplifier stages also suppress the build up of amplified spontaneous emission in the amplifiers allowing for a concentration of the output power in high-energy ultra-short pulses. The amplification stages are compatible with PSMs and PCMs as discussed before; where the dispersion of the whole system can be minimized to obtain the shortest possible pulses at the output of the system.

Amplifier module AM1 3a can be designed as a parabolic amplifier producing pulses with a parabolic spectrum. Equally, the parabolic pulses from AM1 3a can be transformed into pulses with a parabolic pulse spectrum in a subsequent length of pulse-shaping or pulse stretching fiber 53 as also shown in FIG. 14, where the interaction of self-phase modulation and positive dispersion performs this transformation. This may be understood, since a chirped pulse with a parabolic pulse profile can evolve asymptotically into a parabolic pulse with a parabolic spectrum in a length of fiber. The parabolic pulse shape maximizes the amount of tolerable self-phase modulation in the subsequent amplification stages, which in turn minimizes the amount of dispersive pulse stretching and compression required in the PSM 2 and PCM 4. Equally, parabolic pulse shapes allow the toleration of significant amounts of self-phase modulation in the PSM 2 without significant pulse distortions.

Once the pulses are stretched, the detrimental influence of self-phase modulation in subsequent amplifiers can be minimized by using flat-top pulse shapes. A flat-top pulse shape can be produced by inserting an optional amplitude filter 54 as shown in FIG. 14 in front of the last amplifier module to produce a flat-top pulse spectrum. A flat-top spectrum is indeed transformed into a flat-top pulse after sufficient pulse stretching, because there is a direct relation between spectral content and time delay after sufficient pulse stretching. It can be shown that even values of self-phase modulation as large as 10*π can be tolerated for flat-top pulses without incurring significant pulse distortions.

An amplitude filter as shown in FIG. 14 may in turn also be used to control the amount of higher-order dispersion in the amplifier chain for strongly chirped pulses in the presence of self-phase modulation when reshaping of the pulse spectrum in the amplifier can be neglected, i.e., outside the regime where parabolic pulses are generated. In this case self-phase modulation produces an effective amount of higher-order dispersion of:

$$\beta_n^{SPM} = \gamma P_0 L_{\mathit{eff}} \frac{d^n S(\omega)}{d\omega^n}|_{\omega=0},$$

where $P_0$ is the peak power of the pulse and $S(\omega)$ is the normalized pulse spectrum. $L_{\mathit{eff}}$ is the effective nonlinear length $L_{\mathit{eff}}=[\exp(gL)-1]/g$, where L is the amplifier length and g is the amplifier gain per unit length. Thus by accurately controlling the spectrum of strongly chirped pulses with an amplitude filter as shown in FIG. 14, any amount of higher-order dispersion can be introduced to compensate for the values of higher-order dispersion in a chirped pulse amplification system. It can indeed be shown for 500 fs pulses stretched to around 1 ns, a phase shift of ≈10 π is sufficient to compensate for the third-order dispersion of a bulk grating compressor (as shown in FIG. 4) consisting of bulk gratings with 1800 grooves/mm. Attractive well-controllable amplitude filters are for example fiber transmission gratings, though any amplitude filter may be used to control the pulse spectrum in front of such a higher-order dispersion inducing amplifier.

Figure 15:
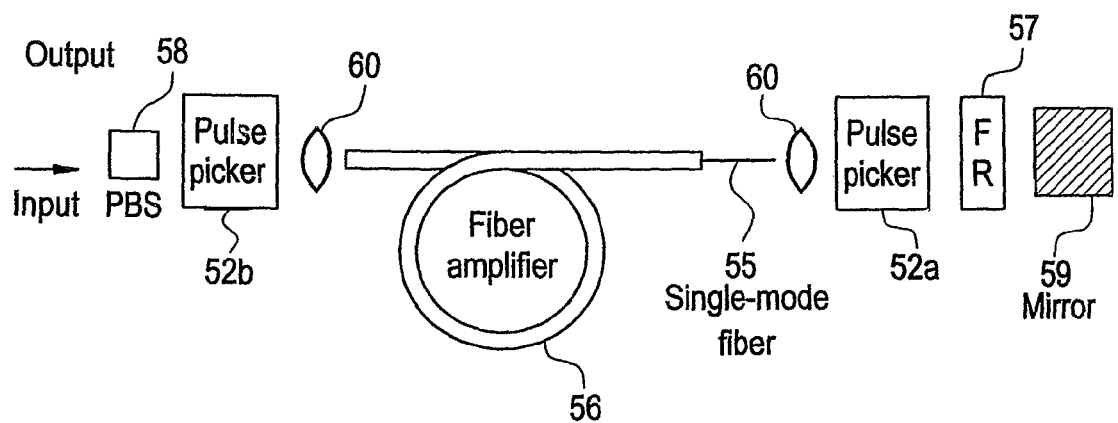
FIG. 15 is an illustration of another embodiment of the present invention where a fiber amplifier is operated with at least one forward and one backward pass, in combination with optical modulators such as pulse picking elements.

As another embodiment for the combination of an amplifier module with a pulse picker, the configuration displayed in FIG. 15 can be used. Since very high energy pulses require large core multi-mode fibers for their amplification, the control of the fundamental mode in a single-pass polarization maintaining fiber amplifier may be difficult to accomplish. In this case, it may be preferred to use a highly centro-symmetric non-polarization maintaining amplifier to minimize mode-coupling and to obtain a high-quality output beam. To obtain a deterministic environmentally stable polarization output from such an amplifier, a double-pass configuration as shown in FIG. 15 may be required. Here a single-mode fiber 55 is used as a spatial mode filter after the first pass through the amplifier 56; alternatively, an aperture could be used here. The spatial mode filter 55 cleans up the mode after the first pass through the multi-mode amplifier 56, and also suppresses amplified spontaneous emission in higher-order modes that tends to limit the achievable gain in a multi-mode amplifier. Lenses 60 can be used for coupling into and out of amplifier 56, spatial mode filter 55, and pulse pickers 52a and 52b. The Faraday rotator 57 ensures that the backward propagating light is polarized orthogonal to the forward propagating light; the backward propagating light is coupled out of the system at the shown polarization beamsplitter 58. To optimize the efficiency of the system, a near-diffraction limited source is coupled into the fundamental mode of the multi-mode fiber 56 at the input of the system, where gain-guiding can also be used to further improve the spatial quality of the beam amplified in the multi-mode fiber. To count-down the repetition rate of the pulse train delivered from a SM and to suppress amplified spontaneous emission in the multi-mode amplifier, a 1st optical modulator 52a can be inserted after the first pass through the multi-mode amplifier. An ideal location is just in front of the reflecting mirror 59 as shown. As a result a double-pass gain as large as 60-70 dB could be obtained in such a configuration, minimizing the number of amplification stages required from amplifying seed pulses with pJ energies up to the mJ energy level. This type of amplifier is fully compatible with the SMs, PSMs and PCMs as discussed before, allowing for the generation of femtosecond pulses with energies in the mJ regime. As another alternative for the construction of a high-gain amplifier module, a count-down of the repetition rate from a pulse train delivered by a SM can also be performed with an additional 2nd modulator 52b prior to injection into the present amplifier module as also shown in FIG. 15. The repetition rate of transmission windows of the 1st modulator 52a should then be either lower or equal to the repetition rate of the transmission window of the 2nd modulator 52b. Such a configuration is not separately shown. FIG. 15 shares some similarities with FIG. 5 of U.S. Pat. No. 5,400,350, which is hereby incorporated by reference.

Figure 16:
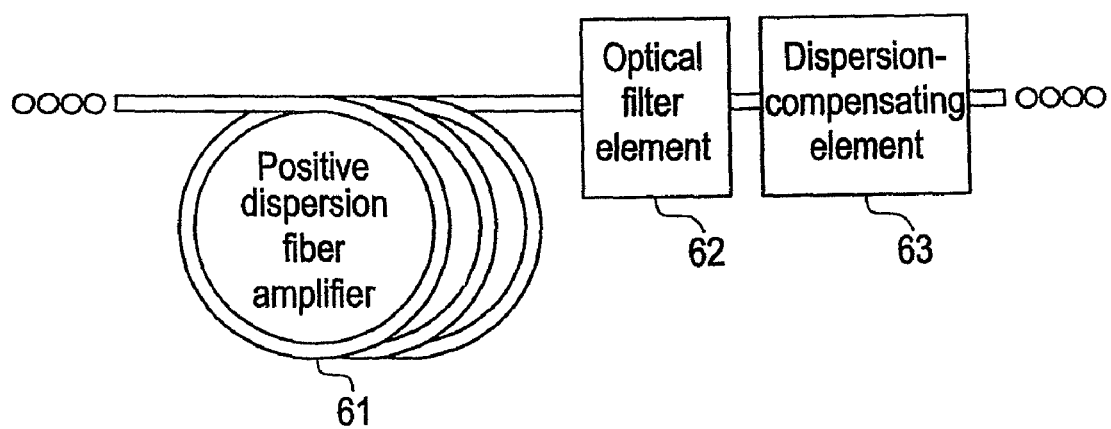
FIG. 16 is an illustration of another embodiment of the present invention in the context of an optical communication system.

As yet another alternative embodiment of the present invention, an optical communication system using the formation of parabolic pulses in long, distributed, positive dispersion amplifiers 61 is shown in FIG. 16. Dispersion compensation elements 63 are inserted in-between the fiber optic amplifiers. Optical filters 62 are further implemented to optimize the pulse formation process in the amplifiers. The optical filters can be based on optical etalons with a limited free spectral range, so as to produce a spectrally repetitive transmission characteristic, allowing for the simultaneous transmission of multiple wavelength channels as required for wavelength-division multiplexing.

The key benefit is the combination of large amounts of gain in long lengths of positive dispersion fiber, to linearize the chirp introduced by optical Kerr-nonlinearities in the fiber transmission system. Therefore, generally, the transmission characteristics of an optical communication system are improved by implementing positive dispersion (non-soliton supporting) amplifiers. Such amplifiers can have lengths of at least 10 km, and a gain of less than 10 dB/km. The total gain per amplifier can exceed 10 dB, in order to exploit the onset of parabolic pulse formation for a minimization of the deleterious effect of optical nonlinearities. Further improvements are gained by using amplifiers having a gain of less then 3 dB/km, and increasing the total length so that the total gain is greater than 20 dB. A still further improvement in the transmission characteristics of the fiber transmission line is obtained by minimizing the amount of Kerr-nonlinearities in the negative dispersion elements of the fiber transmission line. This can be accomplished by the use of chirped fiber gratings for the negative dispersion elements.

In addition to forming parabolic pulses inside the transmission line, it can also be beneficial to generate the parabolic pulses in an external source, and then to inject them into non-soliton supporting amplifier fiber. To make effective use of such a system, low-loss positive dispersion transmission as enabled by holey fibers is useful. Along the fiber transmission line and at the end of the fiber transmission line, dispersion compensating elements are implemented. Such a system implementation is similar to the one shown in FIG. 16, and is not separately shown.

An optical communication system designed along similar lines as described above is disclosed in Provisional Application No. 60/202,826, now U.S. Ser. No. 10/275,137, which is hereby incorporated herein by reference.

As yet another embodiment of the present invention in the telecommunications arena, a wavelength tunable Raman amplifier can be constructed using Raman-shifted pulses. It is well known in the state of the art that a high-power optical signal at a given pump wavelength produces Raman gain at a signal wavelength which is red-shifted with respect to the pump wavelength. In fact, it is this effect acting upon the pump pulse itself which is used for the construction of the wavelength-tunable pulse sources discussed herein.

Figure 17:
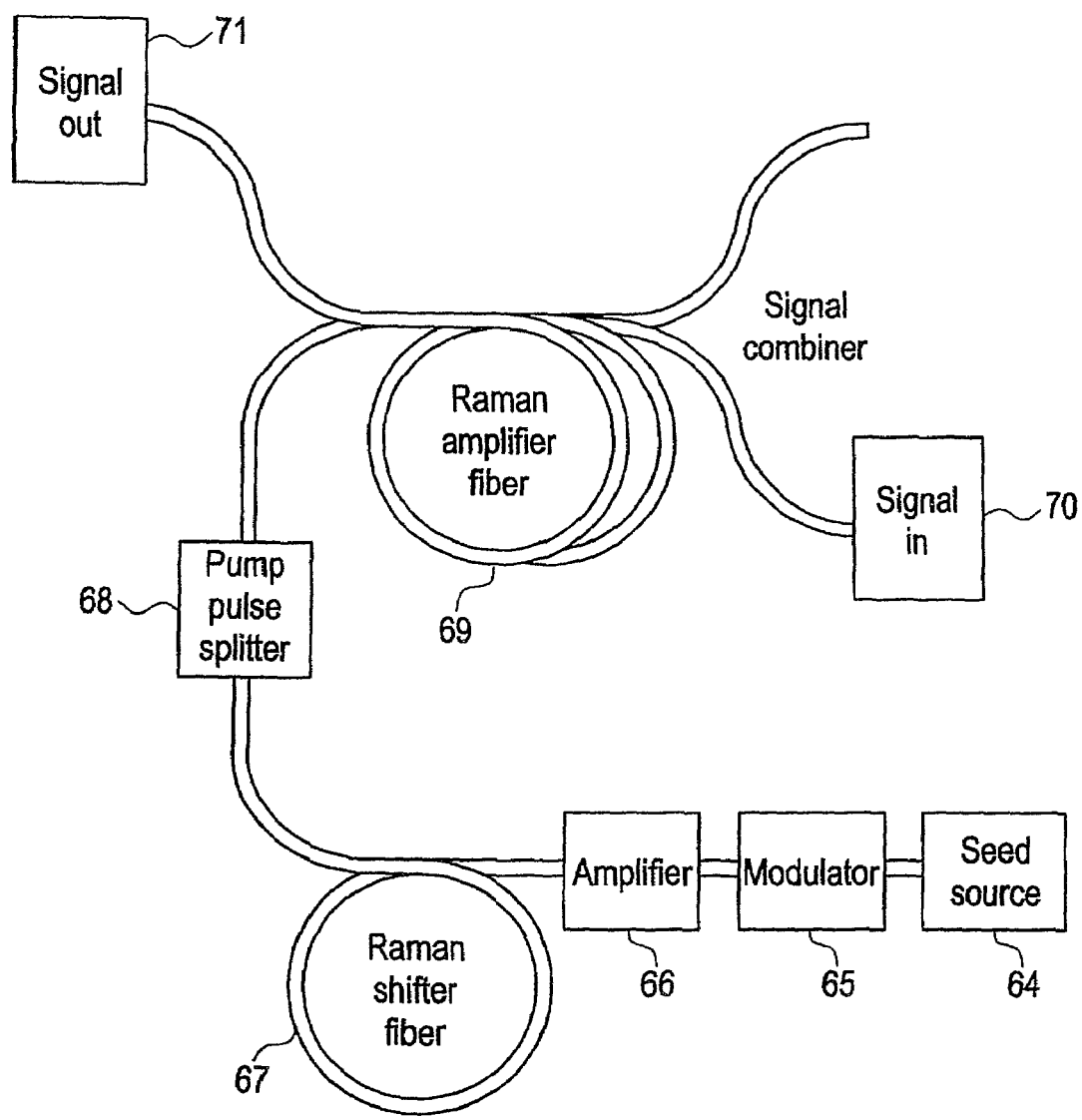
FIG. 17 is an illustration of another embodiment of the present system in the context of a wavelength-tunable Raman amplifier for telecommunications.

A generic design for a wavelength-tunable Raman amplifier is shown in FIG. 17. Here short optical pulses are generated in a seed source 64. The seed pulses are optically modulated by modulator 65 and can also be amplified in an optical amplifier 66. The seed pulses are then injected into a length of Raman-shifting fiber 67. The Raman-shifting fiber can be a length of holey fiber or of any other design. The time period between the Raman-shifted pulses can be reduced by using a pulse splitting means (pump pulse splitter) 68 as shown in FIG. 17. This pulse splitting means could for example be an array of imbalanced Mach-Zehnder interferometers, though any means for generating a pulse train from a single pulse is acceptable. The appropriately wavelength-shifted, amplified and modulated seed pulses comprise the pump pulses that are injected into the Raman amplifier fiber 69 and generate optical gain at a signal wavelength inside the Raman amplifier as shown in FIG. 17, to thereby operate on signal in 70 to produce signal out 71.

Inside the Raman amplifier fiber the optical signal at the signal wavelength is counterpropagating with respect to the pump pulses in the Raman amplifier. Also several signal wavelengths can be simultaneously injected into the Raman amplifier using a signal combiner, making such an amplifier compatible with optical wavelength division multiplexing. For example, pump pulses at a wavelength of 1470 nm generate Raman gain around the 1560 nm wavelength region in a silica fiber. To optimize the gain of the Raman amplifier, holey fiber or other fiber with a relatively small fiber core diameter can be used.

The center wavelength of the wavelength at which Raman gain is obtained is then tunable by tuning the wavelength of the pump pulses. Wavelength-tuning of the pump pulses can be accomplished by modulating the power as well as the width of the seed pulses before injected them into the Raman-shifter fiber 67.

Moreover, the gain spectrum of the Raman amplifier can be adjusted by rapidly tuning the wavelength of the pump pulses, such that the signal pulses are subjected to an effective modified Raman gain spectrum. To make sure the effective Raman gain is independent of time, the speed of tuning the pump pulses, i.e. the time period it takes to tune the pulses across a desired wavelength range, should be small compared to the time it takes for the signal pulses to traverse the Raman amplifier fiber 69.

Thus for Raman amplifiers for telecomm systems it is advantageous to obtain broader spectral gain than is possible from a single pulse. It is also advantageous to be able to dynamically change the gain in WDM telecommunication systems to compensate for the varying amount of data being transmitted at different wavelengths. The one way to broaden the spectral gain is to rapidly tune the pump wavelength compared to the propagation time through the communication fiber. The gain can be dynamically adjusted by varying the time that the pump remains at different wavelengths. An alternative means of adjusting the gain spectrum is to use a plurality of pump pulses into the Raman shifting fiber each at a different wavelength. Modulating the relative number of pulses at each of the wavelengths can then modify the relative gain profile.

More specifically, the femtosecond pulse source described in FIG. 1 is amplified in Yb amplifiers to high powers. These pulses can then be Raman self-frequency shifted to the 1400-1500 nm range by a fiber with the zero dispersion point at a shorter wavelength than the operating point of the femtosecond pulse source. This fiber could be a holey fiber. In order to attain power in the watt level with the Raman self-frequency shift to the 1400-1500 nm range, the optimum repetition rate of the source will be at higher frequencies, such as greater than 1 Ghz. Gain spectral broadening and automatic gain control can be obtained by using a plurality of pump wavelengths, by tuning the pump wavelength or by modulating the pulse amplitude of individual pulses in the pulse train to obtain different amounts of Raman shift.

What is claimed is:

1. A fiber based chirped pulse amplification system generating output pulses in the range of 1-1.15 μm, comprising:
a seed source comprising a diode-pumped, passively modelocked fiber laser comprising a saturable absorber and generating pulses in the 1-1.15 μm wavelength region;
a pulse stretcher which receives said pulses from said seed source, stretches said pulses in time, and outputs said stretched optical pulses;
a Yb: fiber amplifier which receives said stretched optical pulses and generates amplified and stretched optical pulses;
an optical modulator disposed between said passively modelocked fiber laser and said Yb: fiber amplifier, said modulator being controllable to reduce the repetition rate of pulses injected into said Yb: fiber amplifier, to increase the available pulse energy of pulses amplified with said Yb: fiber amplifier, and to provide for selection of pulses for amplification with said Yb: fiber amplifier; and
a pulse compressor which inputs said amplified and stretched pulses and temporally compresses the amplified and stretched pulses to approximately their bandwidth limit.

2. The fiber chirped pulse amplification system according to claim 1, wherein said passively modelocked fiber laser is polarization maintaining.

3. The fiber chirped pulse amplification system according to claim 1, wherein said passively modelocked fiber laser is single-mode and polarization maintaining.

4. The fiber chirped pulse amplification system according to claim 1, wherein said Yb: fiber amplifier is cladding-pumped.

5. The fiber chirped pulse amplification system according to claim 1, further comprising: a coupler between the seed source and the Yb: fiber amplifier, which couples the seed source to the Yb: fiber amplifier, and which further comprises an optical fiber with a length less than 1 km.

6. The fiber chirped pulse amplification system according to claim 1, further comprising: an optical delivery fiber coupled to the output of the Yb: fiber amplifier.

7. The fiber chirped pulse amplification system according to claim 6, wherein said optical delivery fiber comprises one or more of a holey fiber, a length of few-moded fiber and a length of few-moded fiber spliced together with one or two lengths of single-mode fiber.

8. The fiber chirped pulse amplification system according to claim 1, wherein said pulse stretcher comprises a fiber with a length less than 1 km.

9. The fiber chirped pulse amplification system according to claim 1, said system comprising a plurality of Yb: fiber amplifiers disposed in series, wherein said modulator is disposed between said passively mode locked laser and one of said Yb: fiber amplifiers.

10. The fiber chirped pulse amplification system according to claim 1, wherein said pulse stretcher comprises a length of few-moded fiber.

11. The fiber chirped pulse amplification system according to claim 1, wherein said pulse stretcher comprises a length of few-moded fiber spliced together with one or more lengths of single-mode fiber.

12. The fiber chirped pulse amplification system according to claim 1, wherein said pulse stretcher comprises a single-mode fiber with a length less than 1 km.

13. The fiber chirped pulse amplification system according to claim 1, wherein said pulse stretcher comprises a fiber with a W refractive index profile.

14. The fiber chirped pulse amplification system according to claim 1, wherein said pulse stretcher comprises a fiber with a multi-clad refractive index profile.

15. The fiber chirped pulse amplification system according to claim 1, wherein said pulse stretcher comprises:
   a length of fiber with negative $3^{rd}$ order dispersion; and
   a linearly chirped fiber grating with negative $2^{nd}$ order dispersion.

16. The fiber chirped pulse amplification system according to claim 1, wherein said system comprises a cascaded arrangement of Yb: fiber amplifiers and modulators.

17. The fiber chirped pulse amplification system according to claim 1, wherein said seed source comprises a Yb: fiber laser.

18. The fiber chirped pulse amplification system according to claim 1, wherein said seed source comprises an Nd: fiber laser.

19. The fiber chirped pulse amplification system according to claim 1, wherein said pulse stretcher comprises a length of holey fiber.

20. The fiber chirped pulse amplification system according to claim 19, wherein said holey fiber is capable of providing adjustable values of 2nd, 3rd and a higher-order dispersion.

21. The fiber chirped pulse amplification system according to claim 19, wherein said pulses are stretched by more than a factor of 10.

* * * * *